(12) United States Patent
Furman et al.

(10) Patent No.: US 8,494,976 B2
(45) Date of Patent: Jul. 23, 2013

(54) SYSTEM FOR OPTIMIZING TRANSPORTATION SCHEDULING AND INVENTORY MANAGEMENT OF BULK PRODUCT FROM SUPPLY LOCATIONS TO DEMAND LOCATIONS

(75) Inventors: Kevin C. Furman, Glen Gardner, NJ (US); Gary R. Kocis, Vienna, VA (US); Michael K. McDonald, Burke, VA (US); Philip H. Warrick, Oakton, VA (US); Marco A. Duran, Flemington, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1085 days.

(21) Appl. No.: 11/802,616

(22) Filed: May 24, 2007
(Under 37 CFR 1.47)

(65) Prior Publication Data

US 2008/0294484 A1 Nov. 27, 2008

Related U.S. Application Data

(60) Provisional application No. 60/809,347, filed on May 31, 2006.

(51) Int. Cl.
*G06F 17/00* (2006.01)
*G06Q 30/00* (2012.01)
*G06Q 10/00* (2012.01)

(52) U.S. Cl.
USPC ............................ 705/400; 705/330; 705/1.1

(58) Field of Classification Search
USPC .................. 705/7–11, 28–30, 330–341, 1.1, 705/400, 22, 32, 413, 414, 500, 7.11, 7.12, 705/7.22–7.27, 7.29, 7.31, 7.34, 7.35, 7.36–7.38; 700/28, 29, 32, 33, 34, 36; 703/2, 703/6
See application file for complete search history.

(56) References Cited

U.S. PATENT DOCUMENTS 5,742,931 A * 4/1998 Spiegelhoff et al. ......... 705/7.25
5,983,198 A 11/1999 Mowery et al.
(Continued)

FOREIGN PATENT DOCUMENTS

JP 2000-057220 2/2000
JP 2000-172745 6/2000
JP 2001-307279 2/2001

OTHER PUBLICATIONS

M. Christiansen, "Decomposition of a combined inventory and time constrained ship routing problem", Transportation Science, (1999), pp. 3-16, 33(1).

(Continued)

*Primary Examiner* — Igor Borissov
(74) *Attorney, Agent, or Firm* — Glenn T. Barrett; W. Robinson H. Clark

(57) ABSTRACT

An optimization system for transportation scheduling and inventory management of a bulk product from supply locations to demand locations is provided. The system has a mathematical model containing mathematical programming equations. In one embodiment, the objective function of the mathematical model is to minimize a cost basis of the product transported. The system also has a database system for data input that interfaces with the mathematical model. The last component of the system is a mathematical optimization solver that solves the equations provided by the mathematical model after the mathematical model receives data from the database system. As a result, the optimization system provides optimized or simulated results for the input data.

34 Claims, 8 Drawing Sheets

U.S. PATENT DOCUMENTS

Figure 1:
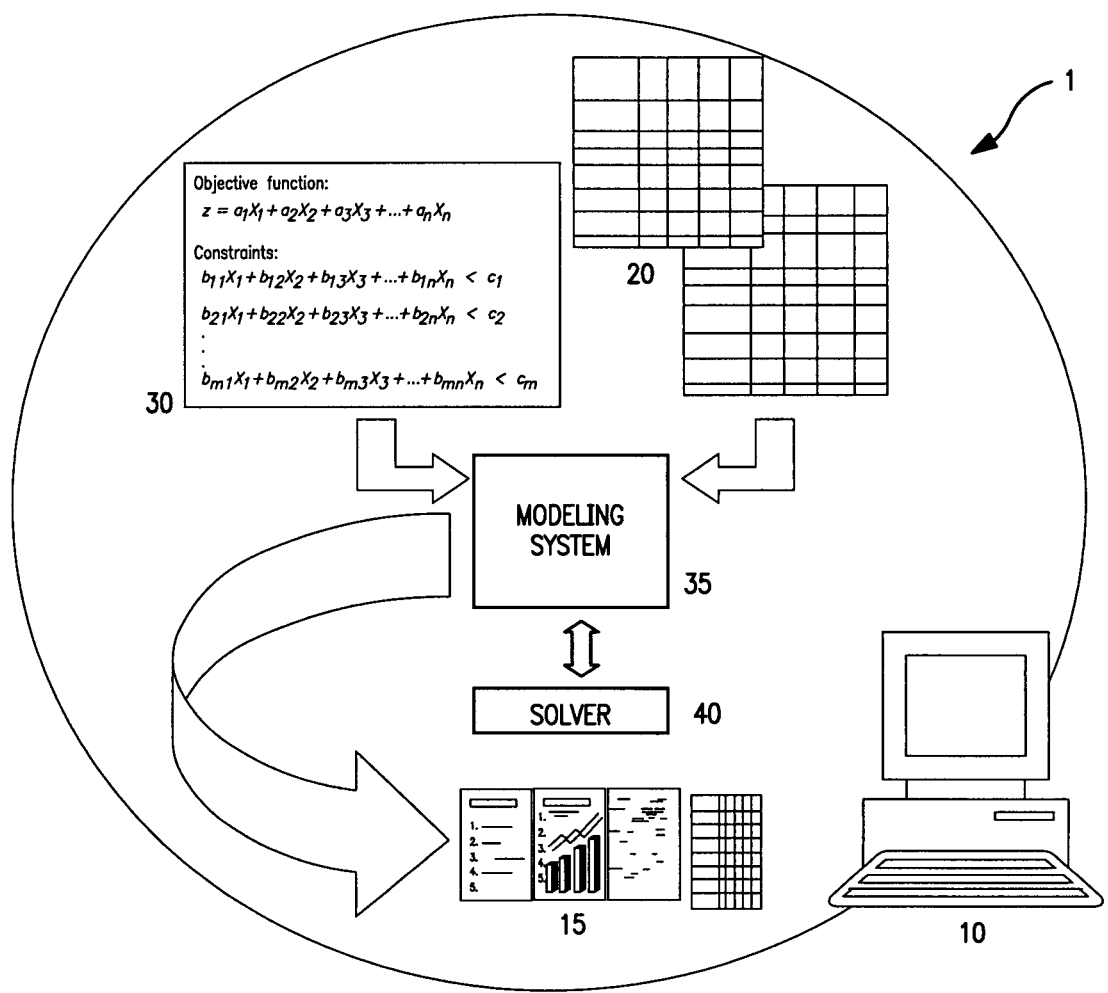

| | | | |
|---|---|---|---|
| 6,370,515 B1 | 4/2002 | Diamond et al. | |
| 6,519,568 B1 | 2/2003 | Harvey et al. | |
| 6,715,514 B2 | 4/2004 | Parker, III et al. | |
| 6,915,268 B2 * | 7/2005 | Riggs et al. | 705/7 |
| 6,983,186 B2 * | 1/2006 | Navani et al. | 700/95 |
| 7,003,474 B2 | 2/2006 | Lidow | |
| 7,035,767 B2 | 4/2006 | Archer et al. | |
| 7,385,529 B2 * | 6/2008 | Hersh et al. | 340/988 |
| 7,448,046 B2 * | 11/2008 | Navani et al. | 719/316 |
| 2002/0007302 A1 * | 1/2002 | Work et al. | 705/10 |
| 2002/0049622 A1 * | 4/2002 | Lettich et al. | 705/7 |
| 2002/0049667 A1 | 4/2002 | Navani et al. | |
| 2002/0107645 A1 | 8/2002 | Uzzo et al. | |
| 2004/0220844 A1 | 11/2004 | Sanville et al. | |
| 2004/0267395 A1 * | 12/2004 | Discenzo et al. | 700/99 |
| 2005/0113954 A1 | 5/2005 | Walser et al. | |
| 2007/0112723 A1 * | 5/2007 | Alvarez et al. | 707/2 |

OTHER PUBLICATIONS

M. Christiansen and B. Nygreen, "Modeling path flows for a combined ship routing and inventory management problem", Annals of Operations Research, (1998), pp. 391-412, 82.

M. Christiansen and B. Nygreen, "A method for solving ship routing problems with inventory constraints", Annals of Operations Research, (1998), pp. 357-378, 81.

D. Ronen, "Marine inventory routing: shipments planning", Journal of the Operational Research Society, (2002), pp. 108-114, 53.

PCT International Search Report.

Search Report, European Appl. No. 07795655.5, dated Aug. 2, 2010, 8 pages.

* cited by examiner

| | A | B | C | D | E | F | G | H | I | J | K | L | M |
|---|---|---|---|---|---|---|---|---|---|---|---|---|---|
| 1 | | | | | | | | | | | | | |
| 2 | Production Schedule for Load Ports | | | | | | | | | | | | |
| 3 | XOM Load Ports | | | | | | | | | | | | |
| 4 | | | | | | | | | | | | | |
| 5 | | | Source1 | | | Source2 | | | Source3 | | | | |
| 6 | | Inv | Min | Max | Inv | Min | Max | Inv | Min | Max | Inv | Min | Max |
| 7 | 1-May-06 | 22.6 | 0 | 55 | 25.6 | 0 | 55 | 0.0 | 0 | 55 | 93.0 | 0 | 93 |
| 8 | 2-May-06 | 25.4 | 0 | 55 | 28.1 | 0 | 55 | 0.0 | 0 | 55 | 93.0 | 0 | 93 |
| 9 | 3-May-06 | 31.6 | 0 | 55 | 30.7 | 0 | 55 | 0.0 | 0 | 55 | 93.0 | 0 | 93 |
| 10 | 4-May-06 | 37.9 | 0 | 55 | 33.3 | 0 | 55 | 0.0 | 0 | 55 | 93.0 | 0 | 93 |
| 11 | 5-May-06 | 43.1 | 0 | 55 | 35.9 | 0 | 55 | 0.0 | 0 | 55 | 93.0 | 0 | 93 |
| 12 | 6-May-06 | 43.1 | 0 | 55 | 38.4 | 0 | 55 | 0.0 | 0 | 55 | 93.0 | 0 | 93 |
| 13 | 7-May-06 | 43.1 | 0 | 55 | 41.0 | 0 | 55 | 0.0 | 0 | 55 | 93.0 | 0 | 93 |
| 14 | 8-May-06 | 43.1 | 0 | 45 | 43.6 | 0 | 55 | 0.0 | 0 | 55 | 93.0 | 0 | 93 |
| 15 | 9-May-06 | 43.1 | 0 | 55 | 46.1 | 0 | 55 | 0.0 | 0 | 55 | 93.0 | 0 | 93 |
| 16 | 10-May-06 | 43.1 | 0 | 55 | 48.7 | 0 | 55 | 25.0 | 0 | 55 | 93.0 | 0 | 93 |
| 17 | 11-May-06 | 43.1 | 0 | 55 | 51.3 | 0 | 55 | 25.0 | 0 | 55 | 93.0 | 0 | 93 |
| 18 | 12-May-06 | 49.3 | 0 | 55 | 53.9 | 0 | 55 | 25.0 | 0 | 0 | 93.0 | 0 | 93 |
| 19 | 13-May-06 | 52.0 | 0 | 55 | 56.4 | 0 | 55 | 25.0 | 0 | 0 | 93.0 | 0 | 93 |
| 20 | 14-May-06 | 58.3 | 0 | 55 | 59.0 | 0 | 55 | 25.0 | 0 | 0 | 93.0 | 0 | 93 |
| 21 | 15-May-06 | 64.5 | 0 | 55 | 61.6 | 0 | 55 | 25.0 | 0 | 0 | 93.0 | 0 | 93 |
| 22 | 16-May-06 | 70.8 | 0 | 55 | 64.1 | 0 | 55 | 25.0 | 0 | 0 | 93.0 | 0 | 0 |
| 23 | 17-May-06 | 77.0 | 0 | 55 | 66.7 | 0 | 55 | 25.0 | 0 | 0 | 93.0 | 0 | 0 |
| 24 | 18-May-06 | 83.2 | 0 | 55 | 69.3 | 0 | 55 | 25.0 | 0 | 0 | 93.0 | 0 | 0 |
| 25 | 19-May-06 | 86.0 | 0 | 55 | 71.9 | 0 | 55 | 25.0 | 0 | 0 | 93.0 | 0 | 0 |
| 26 | 20-May-06 | 92.2 | 0 | 55 | 74.4 | 0 | 55 | 25.0 | 0 | 0 | 93.0 | 0 | 0 |
| 27 | 21-May-06 | 98.5 | 0 | 55 | 77.0 | 0 | 55 | 25.0 | 0 | 0 | 93.0 | 0 | 0 |
| 28 | 22-May-06 | 104.7 | 0 | 55 | 79.6 | 0 | 55 | 25.0 | 0 | 0 | 93.0 | 0 | 0 |
| 29 | 23-May-06 | 110.9 | 0 | 55 | 82.1 | 0 | 55 | 25.0 | 0 | 0 | 93.0 | 0 | 0 |
| 30 | 24-May-06 | 117.2 | 0 | 55 | 84.7 | 0 | 55 | 25.0 | 0 | 0 | 93.0 | 0 | 0 |
| 31 | 25-May-06 | 119.9 | 0 | 55 | 87.3 | 0 | 55 | 25.0 | 0 | 0 | 93.0 | 0 | 0 |
| 32 | 26-May-06 | 126.2 | 0 | 55 | 89.9 | 0 | 55 | 25.0 | 0 | 0 | 93.0 | 0 | 0 |
| 33 | 27-May-06 | 132.4 | 0 | 55 | 92.4 | 0 | 55 | 25.0 | 0 | 0 | 93.0 | 0 | 0 |
| 34 | 28-May-06 | 138.6 | 0 | 55 | 95.0 | 0 | 55 | 25.0 | 0 | 0 | 93.0 | 0 | 0 |
| 35 | 29-May-06 | 144.9 | 0 | 55 | 97.6 | 0 | 55 | 25.0 | 0 | 0 | 93.0 | 0 | 0 |
| 36 | 30-May-06 | 151.1 | 0 | 55 | 100.1 | 0 | 55 | 25.0 | 0 | 0 | 93.0 | 0 | 0 |
| 37 | 31-May-06 | 153.9 | 0 | 55 | 102.7 | 0 | 55 | 25.0 | 0 | 0 | 93.0 | 0 | 0 |

Discharge Port Information

ProductionDemandInfo / Contact-RolloverVessels / Co

FIG. 2A

|     | A | B | C | D | E | F | G | H | I | J | K | L | M |
|---|---|---|---|---|---|---|---|---|---|---|---|---|---|
| 129 | Demand Schedule for Discharge Ports | | | | | | | Load Port Information | | | | | |
| 130 | | | | | | | | | | | | | |
| 131 | XOM Discharge Ports | | | | | | | | | | | | |
| 132 | | | | | | | | | | | | | |
| 133 | | | Dest1 | | | Dest2 | | | Dest3 | | | Dest4 | |
| 134 | | Inv | Min | Max | Inv | Min | Max | Inv | Min | Max | Inv | Min | Max |
| 155 | 21-May-06 | 0 | 0 | 72 | 0 | 0 | 72 | 0.0 | 0 | 55 | 0.0 | 0 | 72 |
| 156 | 22-May-06 | 0 | 0 | 72 | 0 | 0 | 72 | 0.0 | 0 | 55 | 0.0 | 0 | 72 |
| 157 | 23-May-06 | 0 | 0 | 72 | 0 | 0 | 72 | 0.0 | 0 | 55 | 0.0 | 0 | 72 |
| 158 | 24-May-06 | 0 | 0 | 72 | 0 | 0 | 72 | 0.0 | 0 | 55 | 0.0 | 0 | 72 |
| 159 | 25-May-06 | 0 | 0 | 72 | 0 | 0 | 72 | 0.0 | 0 | 55 | 0.0 | 0 | 72 |
| 160 | 26-May-06 | 0 | 0 | 72 | 0 | 0 | 72 | 0.0 | 0 | 55 | 0.0 | 0 | 72 |
| 161 | 27-May-06 | 0 | 0 | 72 | 0 | 0 | 72 | 0.0 | 0 | 55 | 0.0 | 0 | 72 |
| 162 | 28-May-06 | 0 | 0 | 72 | 0 | 0 | 72 | 0.0 | 0 | 55 | 0.0 | 0 | 72 |
| 163 | 29-May-06 | 0 | 0 | 72 | 0 | 0 | 72 | 0.0 | 0 | 55 | 0.0 | 0 | 72 |
| 164 | 30-May-06 | 0 | 0 | 72 | 0 | 0 | 72 | 0.0 | 0 | 55 | 0.0 | 0 | 72 |
| 165 | 31-May-06 | 0 | 0 | 72 | 0 | 0 | 72 | 0.0 | 0 | 55 | 0.0 | 0 | 72 |
| 166 | 1-Jun-06 | 0 | 0 | 72 | 0 | 0 | 72 | 0.0 | 0 | 55 | 0.0 | 0 | 72 |
| 167 | 2-Jun-06 | 0 | 0 | 72 | 0 | 0 | 72 | 0.0 | 0 | 55 | 0.0 | 0 | 72 |
| 168 | 3-Jun-06 | 0 | 0 | 72 | 0 | 0 | 72 | 0.0 | 0 | 55 | 0.0 | 0 | 72 |
| 169 | 4-Jun-06 | 0 | 0 | 72 | 0 | 0 | 72 | 0.0 | 0 | 55 | 0.0 | 0 | 72 |
| 170 | 5-Jun-06 | 0 | 0 | 72 | 0 | 0 | 72 | 0.0 | 0 | 55 | 0.0 | 0 | 72 |
| 171 | 6-Jun-06 | 0 | 0 | 72 | 0 | 0 | 72 | 0.0 | 0 | 55 | 0.0 | 0 | 72 |
| 172 | 7-Jun-06 | 0 | 0 | 72 | 0 | 0 | 72 | 0.0 | 0 | 55 | 0.0 | 0 | 72 |
| 173 | 8-Jun-06 | 0 | 0 | 72 | 0 | 0 | 72 | 0.0 | 0 | 55 | 0.0 | 0 | 72 |
| 174 | 9-Jun-06 | 0 | 0 | 72 | 0 | 0 | 72 | 0.0 | 0 | 55 | 0.0 | 0 | 72 |
| 175 | 10-Jun-06 | 0 | 0 | 72 | 0 | 0 | 72 | 0.0 | 0 | 55 | 0.0 | 0 | 72 |
| 176 | 11-Jun-06 | 0 | 0 | 72 | 0 | 0 | 72 | 0.0 | 0 | 55 | 0.0 | 0 | 72 |
| 177 | 12-Jun-06 | 0 | 0 | 72 | 0 | 0 | 72 | 0.0 | 0 | 55 | 0.0 | 0 | 72 |
| 178 | 13-Jun-06 | 0 | 0 | 72 | 0 | 0 | 72 | 0.0 | 0 | 55 | 0.0 | 0 | 72 |
| 179 | 14-Jun-06 | 0 | 0 | 72 | 0 | 0 | 72 | 0.0 | 0 | 55 | 0.0 | 0 | 72 |
| 180 | 15-Jun-06 | 0 | 0 | 72 | 0 | 0 | 72 | 0.0 | 0 | 55 | 0.0 | 0 | 72 |
| 181 | 16-Jun-06 | 0 | 0 | 72 | 0 | 0 | 72 | 0.0 | 0 | 55 | 0.0 | 0 | 72 |
| 182 | 17-Jun-06 | 0 | 0 | 72 | 0 | 0 | 72 | 0.0 | 0 | 55 | 0.0 | 0 | 72 |
| 183 | 18-Jun-06 | 0 | 0 | 72 | 0 | 0 | 72 | 0.0 | 0 | 55 | 0.0 | 0 | 72 |
| 184 | 19-Jun-06 | 0 | 0 | 72 | 0 | 0 | 72 | 0.0 | 0 | 55 | 0.0 | 0 | 72 |
| 185 | 20-Jun-06 | 0 | 0 | 72 | 0 | 0 | 72 | 0.0 | 0 | 55 | 0.0 | 0 | 72 |
| 255 | | | | | | | | | | | | | |

ProductionDemandInfo / Contact-RolloverVessels / Co

FIG. 2B

FIG. 2C

VESSEL INFORMATION

| | Vessel Use | Vessel Type | Max. Capacity | World Scale | Base Volume | Overage | Demurrage | Initial Volume | Max Demurrage Days (new only) | Start Date for Vessel | Last Window Date | Penalty/ Incentive to use Vessel | Min % Capacity |
|---|---|---|---|---|---|---|---|---|---|---|---|---|---|
| Ship1 | Chartered | Panamax | 55 | 1.909 | 55 | 1.0 | 30 | | 12 | 08-May-06 | 15-May-06 | 0 | 0 |
| Ship2 | Chartered | Aframax | 80 | 1.600 | 80 | 1.0 | 35 | | 12 | 10-May-06 | 14-May-06 | -500 | 0 |
| Ship3 | Chartered | Aframax | 80 | 1.600 | 80 | 1.0 | 35 | | 12 | 14-May-06 | 26-May-06 | -500 | 0 |
| Ship4 | New | Panamax | 55 | 1.909 | 55 | 1.0 | 30 | | 12 | 20-May-06 | 31-May-06 | 0 | 0 |
| Ship5 | New | Aframax | 80 | 1.500 | 80 | 1.0 | 35 | | 12 | 08-May-06 | 31-May-06 | 100 | 0 |
| | New | Panamax | 55 | 2.100 | 55 | 1.0 | 35 | | 12 | 15-Mar-06 | 31-Mar-06 | 100 | 0 |
| | Chartered | Aframax | 80 | 1.600 | 80 | 1.0 | 33 | | 12 | 22-Mar-06 | 31-Mar-06 | 0.003 | 0 |
| | | | | | | | 40 | | | | | -750 | |

Default Values

| | Max. Capacity | World Scale | Base Volume | Overage | Demurrage | Initial Volume | Max Demurrage Days | Start Date for Vessel | Last Window Date | Penalty/ Incentive to use Vessel | Min % Basis Vol |
|---|---|---|---|---|---|---|---|---|---|---|---|
| Class1 | 75 | 1.8 | 80 | 0.5 | 30 | | 0 | 1-May-06 | 31-May-06 | 0 | 0 |
| Class2 | 55 | 2.525 | 50 | 0.5 | 27 | | 0 | 1-May-06 | 31-May-06 | 0 | |

FIG. 2D

FIG. 2E

| | N | O | P | Q | R | S | T | U | V | W | X | AA |
|---|---|---|---|---|---|---|---|---|---|---|---|---|
| 1 | | Cost | | | | | | | | | | |
| 2 | | | | | | | | | | | | |
| 3 | | Load to Load | | | | | | | | | | |
| 4 | | | Source1 | Source2 | Source3 | Source4 | Source5 | Source6 | Source7 | Source8 | Source9 | |
| 5 | | Source1 | 0 | 2 | 2 | 2 | 0 | 2 | 0 | 2 | 2 | |
| 6 | | Source2 | 2 | 0 | 2 | 1 | 2 | 2 | 2 | 0 | 2 | |
| 7 | | Source3 | 1 | 2 | 0 | 0 | 2 | 4 | 2 | 1 | 2 | |
| 8 | | Source4 | 2 | 2 | 1 | 0 | 2 | 2 | 2 | 0 | 3 | |
| 9 | | Source5 | 0 | 2 | 2 | 2 | 0 | 4 | 4 | 4 | 2 | |
| 10 | From | Source6 | 4 | 3 | 4 | 4 | 4 | 0 | 0 | 2 | 2 | To |
| 11 | | Source7 | 0 | 2 | 2 | 2 | 0 | 2 | 0 | 2 | 2 | |
| 12 | | Source8 | 2 | 2 | 0 | 2 | 2 | 4 | 2 | 0 | 2 | |
| 13 | | Source9 | 3 | 2 | 2 | 3 | 3 | 2 | 3 | 2 | 0 | |
| 14 | | | | | | | | | | | | |
| 15 | | | | | | | | | | | | |
| 16 | | | | | | | | | | | | |
| 17 | | Load to Discharge | | | | | | | | | | |
| 18 | | | Dest1 | Dest2 | Dest3 | Dest4 | | | | | | |
| 19 | | Source1 | 13 | 13 | 13 | 14 | | | | | | |
| 20 | | Source2 | 13 | 14 | 13 | 14 | | | | | | |
| 21 | | Source3 | 12 | 12 | 12 | 14 | | | | | | |
| 22 | | Source4 | 13 | 13 | 13 | 14 | | | | | | |
| 23 | | Source5 | 15 | 15 | 15 | 16 | | | | | | |
| 24 | | Source6 | 13 | 13 | 13 | 14 | | | | | | |
| 25 | | Source7 | 12 | 12 | 12 | 14 | | | | | | |
| 26 | | Source8 | 14 | 14 | 14 | 14 | | | | | | |
| 27 | | Source9 | | | | | | | | | | | |
| 28 | | | | | | | | | | | | |
| 29 | | | | | | | | | | | | |
| 30 | | | | | | | | | | | | |
| 31 | | Discharge to Discharge | | | | | | | | | | |
| 32 | | | Dest1 | Dest2 | Dest3 | Dest4 | | | | | | |
| 33 | | Dest1 | 0 | 0 | 0 | 2 | | | | | | |
| 34 | | Dest2 | 1 | 0 | 1 | 2 | | | | | | |
| 35 | | Dest3 | 0 | 2 | 0 | 2 | | | | | | |
| 36 | | Dest4 | 2 | 2 | 2 | 0 | | | | | | |
| 37 | | | | | | | | | | | | |

Constants / PortVessel / ProductionDemandInfo / Contract-RolloverVessels \ CostTime /

FIG. 2F

| | A | B | C | D | E | F | G | H | I | J | K | L | M |
|---|---|---|---|---|---|---|---|---|---|---|---|---|---|
| 1 | Time | | | | | | | | | | | | |
| 2 | | | | | | | | | | | | | |
| 3 | Load to Load – days | | | | | | | | | | | | |
| 4 | | Source1 | Source2 | Source3 | Source4 | Source5 | Source6 | Source7 | Source8 | Source9 | | | |
| 5 | Source1 | 0 | 2 | 1 | 2 | 2 | 4 | 2 | 1 | 2 | | | |
| 6 | Source2 | 2 | 0 | 2 | 1 | 1 | 2 | 1 | 2 | 1 | | | |
| 7 | Source3 | 1 | 2 | 0 | 0 | 0 | 4 | 1 | 0 | 2 | | | |
| 8 | Source4 | 1 | 2 | 1 | 0 | 4 | 4 | 1 | 1 | 2 | | | |
| 9 | Source5 | 4 | 2 | 4 | 4 | 0 | 4 | 4 | 4 | 1 | | | |
| 10 | Source6 | 1 | 2 | 1 | 4 | 4 | 0 | 0 | 1 | 2 | | | |
| 11 | Source7 | 1 | 2 | 1 | 1 | 1 | 4 | 0 | 0 | 1 | | | |
| 12 | Source8 | 1 | 2 | 0 | 1 | 1 | 4 | 1 | 0 | 2 | | | |
| 13 | Source9 | 2 | 1 | 2 | 2 | 2 | 1 | 2 | 2 | 0 | | | |
| 14 | | | | | | | | | | | | | |
| 15 | | | | | | | | | | | | | |
| 16 | Load to Discharge | | | | | | | | | | | | |
| 17 | | Dest1 | Dest2 | Dest3 | Dest4 | | | | | | | | |
| 18 | | | | | | | | | | | | | |
| 19 | Source1 | 17 | 17 | 17 | 17 | | | | | | | | |
| 20 | Source2 | 17 | 17 | 17 | 17 | | | | | | | | |
| 21 | Source3 | 17 | 17 | 17 | 17 | | | | | | | | |
| 22 | Source4 | 17 | 17 | 17 | 17 | | | | | | | | |
| 23 | Source5 | 17 | 17 | 17 | 17 | | | | | | | | |
| 24 | Source6 | 18 | 18 | 18 | 18 | | | | | | | | |
| 25 | Source7 | 17 | 17 | 17 | 17 | | | | | | | | |
| 26 | Source8 | 17 | 17 | 17 | 17 | | | | | | | | |
| 27 | Source9 | 17 | 17 | 17 | 17 | | | | | | | | |
| 28 | | | | | | | | | | | | | |
| 29 | | | | | | | | | | | | | |
| 30 | Discharge to Discharge | | | | | | | | | | | | |
| 31 | | Dest1 | Dest2 | Dest3 | Dest4 | | | | | | | | |
| 32 | | | | | | | | | | | | | |
| 33 | Dest1 | 0 | 2 | 0 | 2 | | | | | | | | |
| 34 | Dest2 | 2 | 0 | 2 | 1 | | | | | | | | |
| 35 | Dest3 | 0 | 2 | 0 | 2 | | | | | | | | |
| 36 | Dest4 | 2 | 1 | 2 | 0 | | | | | | | | |

Constants / PortVessel / ProductionDemandInfo / Contract-RolloverVessels / CostTime

```
File  Edit  Format  View  Help
```
METEOR Transportation Program Report
Date:      10/18/05       Time:     15:21:06
------------------------------------------------------------
Total Shipping Legs Cost =              7187.90
Total Demurrage Cost =                   227.50
------------------------------------------------------------
Total Objective Function Value =        -405.10
Total Overall Shipping Cost =           7405.40
Total Transported =                      177.00
------------------------------------------------------------
Overall ExxonMobil Load Port Report
Port             Initial (kT)    Final (kT)       Total Offload    (kT)
Source1                  9.42         51.52                       137.90
Source2                 14.43         55.00                        39.10
------------------------------------------------------------
Overall Discharge Port Report
Port             Initial (kT)    Final (kT)       Total Disch      (kT)
TP1                      0.00          0.00                        55.00
Dest1                    0.00          0.00                       122.00
Dest2                    0.00          0.00                        42.00
------------------------------------------------------------
Loading Report
Date             Vessel          Load Port        kTons
10/23/2005       Ship1           Source1          32.90
10/25/2005       Ship1           Source2          39.10
10/29/2005       Ship3           Source2          50.00
11/07/2005       Ship2           Source1          55.00
------------------------------------------------------------
Discharge Report
Date             Vessel          Discharge Port   kTons
11/15/2005       Ship1           Dest1            72.00
11/28/2005       Ship3           TP1              55.00
11/29/2005       Ship2           Dest2            50.00

FIG. 2G

SYSTEM FOR OPTIMIZING TRANSPORTATION SCHEDULING AND INVENTORY MANAGEMENT OF BULK PRODUCT FROM SUPPLY LOCATIONS TO DEMAND LOCATIONS

1.0 CROSS REFERENCE TO RELATED APPLICATIONS

This application claims benefit to the filing date of U.S. provisional application No. 60/809,347 filed May 31, 2006.

2.0 BACKGROUND OF THE INVENTION

2.1 Field of the Invention

This invention relates to the field of transportation of bulk product. More particularly the invention relates to optimizing scheduling of transportation vessels of bulk products.

2.2 Description of Related Art

Transportation costs of bulk products often represent a substantial portion of the overall cost for said products. Virtually every bulk product, such as, for example, bulk chemicals (e.g., ammonia) and farm products (e.g., grain), is transported and has associated transportation costs that could be optimized. For example, costs for transportation of refinery feedstocks, which include crude oil, as well as gas oils, naphthas, gasoline blending components and other intermediate streams, as well as finished products such as gasoline, could be optimized.

Current approaches to optimizing transportation costs provide only routing scheduling where there is a known cargo, whether it is discrete or bulk product. No current approach considers simultaneously scheduling transportation and managing inventories with non-constant rates of supply (production) and demand (consumption) of the product with a heterogeneous fleet of vessels that may make multiple loads and discharges. In addition, no other known approach uses realistic economic calculations for shipping that include flat rates, demurrage costs and overage calculations.

For example, the shipping of ammonia has been addressed by Christiansen et. al. M. Christiansen, *Decomposition of a combined inventory and time constrained ship routing problem*, Transportation Science, 33(1): 3-16 (1999). This article poses the problem where inventory management and routing are constrained by time-window requirements and ships are permitted to carry partial loads. A fleet of ships transport a single bulk product between production and consumption harbors. The suggested algorithmic approach breaks the larger problem into sub-problems, which are then solved via dynamic programming as discussed in M. Christiansen and B. Nygreen, *Modeling path flows for a combined ship routing and inventory management problem*, Annals of Operations Research, 82: 391-412 (1998). Some preprocessing steps are introduced to decrease the problem's complexity in order to speed up run times in M. Christiansen and B. Nygreen, *A method for solving ship routing problems with inventory constraints*, Annals of Operations Research, 81: 357-378 (1998). The economic calculations of this approach oversimplify real problems and assume constant rates of production and consumption.

The minimum cost inventory routing problem for multiple bulk liquid products (which cannot be mixed) is addressed by D. Ronen, *Marine inventory routing: shipments planning*, Journal of the Operational Research Society, 53: 108-114 (2002). The ships in this routing problem have multiple compartments and each ship is restricted to loading and unloading at only one port. Additionally, this routing problem only allows a homogeneous pool of vessels.

One commercially available tool for simulating and scheduling shipping is TurboRouter®. This tool, however, does not account for inventory management. Furthermore, the tool is limited in that the pool of vessels must be homogeneous and the vessels can make only one load and one discharge.

There are no existing commercial software tools that jointly route and schedule ships while maintaining inventory profiles. Current practice involves using spreadsheets to manually assign ships to routes and to select load volumes.

A tool or system for optimizing transportation scheduling and inventory management of a bulk product from a group of supply locations to a group of demand locations is needed. There is also a need for a tool or system that facilitates, not only ship selection and routing, but also load/discharge schedules and volumes. Finally, there is a need for a tool or system that provides the optimized results in a practical time frame so that the results may be implemented in a dynamic transportation environment.

3.0 BRIEF DESCRIPTION OF THE DRAWINGS

The following drawings are for illustrative purposes only and are not intended to limit the scope of the present invention in any way:

FIG. 1 illustrates an example system that executes a mathematical model to optimize the transportation scheduling and inventory management of a bulk product.

FIGS. 2A-2G provide a series screenshots for one embodiment of the present invention.

4.0 SUMMARY OF THE INVENTION

An optimization system or tool (tool and system are used interchangeably herein) for transportation scheduling and inventory management of a bulk product from supply locations to demand locations, over a predefined period of time, is provided. The optimization system overcomes the deficiencies in prior art systems by simultaneously scheduling transportation and managing inventories with non-constant rates of supply (production) and demand (consumption) of the product, and with a heterogeneous fleet of vessels that may make multiple loads and discharges. The system considers the various constraints that affect the cost of moving bulk product from one location to another, such as for example, the inventories at each of the loading locations and discharge locations, and how vessels are priced out, including cost factors such as how the various legs for a vehicle, such as a ship, are added together. The tool systematically considers a large number of permutations of these transportation options until it identifies the most economic way to satisfy all supply, demand, inventory, shipping and economic constraints. For example, the system considers whether economy of scale opportunities exist to combine multiple smaller shipments into fewer cheaper larger shipments. The results provided by the system, when implemented in chartering decisions, can provide substantial savings in transportation costs for the product.

5.0 DETAILED DESCRIPTION

5.1 Definitions

The following definitions apply throughout the application unless otherwise noted:

"Bulk product" means any product that is unbound and substantially fluid as loaded; in other words, it is in a loose unpackaged form. Examples of bulk product include coal, grain and petroleum products.

"Constraints" means any restriction the transportation scheduling decisions must satisfy.

"Demand location" is a point, such as port with tanks, to which bulk product is transported from a supply location and from which bulk product is removed at a rate that may or may not be constant.

"Feasible solution" means a solution for a particular set of problem data that honors all the constraints of the model.

"Flow rate" means a measure for describing the amount of bulk product that may be loaded or discharged within a fixed period of time.

"Inventory management" means maintaining product inventory levels at specified supply and demand locations within maximum and minimum product capacity limits, where supply locations require product loading to transport vessels in order to reduce inventory levels, and consumption locations require product discharge from transport vessels in order to increase inventory levels.

"Logical constraints" means constraints based on binary logical expressions.

"Optimal solution" means a solution for a particular set of problem data that honors all the constraints of a model and can be executed at a lowest possible cost basis for that set of data.

"Optimized solution" means a feasible solution that may be optimal or may be one that is less than optimal but the user determines is sufficient.

"Petroleum and petrochemical fluids" means petroleum and/or natural gas and any substance isolated or derived from petroleum and/or natural gas.

"Rolling time horizon" means updating data and decisions to solve for time horizons forward in time, but keeping continuity between adjacent time horizons by implementing the solution of a previous time horizon as a starting point for a new time horizon.

"Routing" means selecting a set of locations for vessels to visit and the particular sequence in which the vessels visit the locations.

"Slack variables" means a variable introduced into a model to loosen constraints.

"Solve" means performing computations of a model until an optimal solution is achieved and the algorithm self terminates, or the user determines that a current feasible solution is sufficient and manually terminates.

"Supply location" is a point, such as port with tanks, where bulk material is produced or accumulated (i.e. bulk product that is produced on site and/or provided to the site) at a rate that may or may not be constant for the purpose of future transportation to a demand location.

"Transportation scheduling" means to select the routing for multiple vessels along with the specific timing of each vessel visit to each location in the routes such that the travel timing between visits is realizable in the real world considering vessel speeds and other timing restrictions. Transportation scheduling meets any specified cargo shipping requirements while adhering to the various capacity, loading and discharging rules and constraints for the vessels and locations.

"Travel leg" means a portion of a route composed of the travel between two locations.

"Vessel" means a vehicle for transporting bulk product. For example, a vessel may be a ship, truck, plane, train, barge or other vehicle for transporting bulk product.

"'What-if' analysis" means an analysis in which the user takes a current data input instance, and makes perturbations or modifications to a few parameters, or even only one parameter, in order to determine if such a change will have an impact on the solution.

5.2 Description of the System

In one embodiment, the invention provides an optimization system for transportation scheduling and inventory management of bulk product from supply locations to demand locations. The system comprises a mathematical model containing mathematical programming equations. An objective function of the mathematical model is to minimize a cost basis of product transportation for multiple shipments over a period of time. The model contains constraints that account for transportation scheduling and inventory management. The model also accounts for the accumulation of bulk product to supply locations and the removal of bulk products from demand locations in a manner such that said accumulation and removal is not required to be constant over time.

The system both quickly finds a first feasible solution, and continues to search through far more cases than an individual can search in a given period of time to find an optimal or more economical feasible solution. In the end, the tool or system reports transportation schedules that are more economic than those the user would have generated by other means. Use of the tool also allows the user to perform "what-if" analyses. A method for optimizing the transportation of bulk product is also provided. One advantage of the optimization tool or system provided by the current invention is that it considers all possible routes and schedules while maintaining the many inventory, tankage, and draft constraints.

The system can be used to optimize the transportation of any bulk material, even industrial gases. The optimization tool and method of the current invention may be applied to many transportation scenarios and is not limited to any particular mode of transportation. Non-limiting examples of modes of transport to which the system and method can be applied include ships, trucks, barges, railcars, and airplanes. The vessels may be homogeneous or heterogeneous. In one preferred embodiment, the system optimizes the transportation of liquid bulk material in a heterogeneous fleet of ships.

Generally, the optimization tool formulates the business problem of reducing the transportation costs as a mathematical model to be solved with a mathematical optimization engine. An objective function is constructed to provide a solution that minimizes the transportation costs for a certain period of time based on some type of cost basis. The particular cost basis is incorporated into the model and is not particularly limited. A suitable cost basis may be any type, including, but not limited to, the following types: (i) minimize overall cost per unit of volume or mass for transportation; (ii) minimize overall transportation costs; (iii) maximize overall profit (revenue minus costs); (iv) minimize number of vessels utilized; (v) minimize average inventory levels; and (vi) any combination thereof.

Accordingly, in one embodiment, the cost basis is selected from the overall cost per unit (weight or volume) of bulk product transported. Alternatively, in another embodiment, the cost basis is overall profit or the maximization of vessel utilization. In one embodiment, the optimization system is directed toward the shipping of a bulk product such as petroleum, natural gas and liquid or gaseous intermediate and final products derived there from. Non-limiting examples include: crude oil; liquefied natural gas; PLNG; intermediate refinery products such as light ends, middle distillate, alkylate, hydrocrackate, gas oils, vacuum gas oil, cycle gas oil, resid, flux stock, naphtha, and reformate; and finished products such as gasoline, diesel, jet fuel, asphalt, marine residual fuel/bunker fuel, refinery fuel gas, liquefied petroleum gas, heating oil, residual oil, greases, lube and process oils, solvents, waxes, turbo fuels, and white oils. In one preferred example the product is crude oil. In another preferred example the product is liquefied natural gas. In another preferred example the product is vacuum gas oil. In another preferred example the product is selected from gasoline, kerosene, and aviation fuel. In yet another preferred example, the product is either gas oil or an intermediate refinery product.

One example of the system is illustrated in FIG. 1. The system is comprised of multiple components. The first component is a database application 20 for input of problem data from a user, and also for data storage. In the preferred embodiment, the database application 20 is MS Excel, but any number of applications may be used and those skilled in the art will readily identify an appropriate application. The database application 20 accepts input of data for one or more, preferably most or all, of the following parameters: (i) basis amount of product for a vessel (i.e., the part cargo minimum); (ii) flat rate for a leg; penalty cost or incentive for using a vessel; (iii) product lifting needs at a port on a day; (iv) demurrage days limit for a vessel; (v) demurrage rate of a vessel; (vi) inlet draft limit of a vessel at a loading port; (vii) outlet draft limit of a vessel at a loading port; (viii) inlet draft limit of a vessel at a discharge port; (ix) minimum flow rate at a port; (x) maximum flow rate at a port; (xi) minimum inventory at a port on a day; (xii) maximum inventory at a port on a day; (xiii) maximum amount of product on a vessel; (xiv) maximum volume of a vessel; (xv) minimum number of tons of product to be transported; (xvi) lower bound on the number of vessels used; (xvii) upper bound on the number of vessels used; (xviii) number of days of discharge port offset; (xix) total number of days in time horizon; (xx) overage rate of a vessel; (xxi) minimum percent full base volume for a vessel; (xxii) product amount produced at a port for each day; (xxiii) maximum cost per volume ratio; (xxiv) start day for demurrage calculation for a chartered vessel; (xxv) travel time for a leg; (xxvi) time window initial day for availability of product load/discharge at a third party port; (xxvii) time window final day for availability of product load/discharge at a third party port; (xxviii) time window initial day for availability at a port; (xxix) time window final day for availability at a port; (xxx) time window initial day for availability of a vessel; (xxxi) time window final day for availability of a vessel; (xxxii) initial inventory of a port; and (xxxiii) world scale multiplier of a vessel.

The second component is a mathematical model 30 for the specific business problem. The mathematical model 30 is preferably written in a modeling language package, such as, for example, GAMS or AIMMS, and contains mathematical programming equations. Preferably, the mathematical model 30 is in the form of a mixed integer linear programming problem. In one embodiment, the mathematical model 30 comprises equations for one or more, preferably most or all, of the following constraints: (i) inventory balance; (ii) flow rate; (iii) logical constraints; (iv) travel time; (v) draft limit; (vi) overage calculation; (vii) demurrage or relaxed demurrage time calculation; and (viii) previously chartered vessels. The mathematical model 30 may allow one or more variables to be fixed. Preferably, the inventory balance constraints contain slack variables that allow the solver to always terminate with a feasible solution. The mathematical model 30 may further comprise equations to define a rolling time horizon and/or grade segregation constraints and/or bounds on the number of vessels used and/or minimum vessel loads and/or minimum volume transported and/or maximum cost-per-amount ratio and/or port-revisit order and timing. Preferably, the mathematical model 30 comprises equations for one or more, and preferably most or all, of the following logical constraints: (i) only one vessel may stop at a particular load or discharge port on any particular day; (ii) a vessel may only be at one place at one time; (iii) if a vessel does not stop at a port, then it may not have any travel legs to or from that port; (iv) a vessel may only take one leg that goes from a load port to a discharge port; (vi) if a vessel stops at a discharge port, then there is a travel leg for entering the port; and (vii) a vessel may only stop at ports and travel between them if there is a load-to-discharge leg in the voyage. Preferably, the mathematical model 30 further comprises equations for bounds or capacities for one or more, and preferably most or all, of the following continuous variables: (i) demurrage days of vessel; (ii) rate of flow of product from a load location to a vessel on a day; (iii) rate of flow of product from a vessel to a discharge location on a day; (iv) total flow of product from a load port to a vessel; (v) total flow of product from a vessel to a discharge port; (vi) first day a vessel starts its trip; (vii) product inventory level at a port at the end of a day; (viii) product inventory level of a vessel at the end of a day; (ix) total maximum product inventory for a vessel; (x) last day a vessel finishes its trips; (xi) overall overage volume of a vessel; (xii) overage volume of a vessel on a leg; and (xiii) total cost.

In one embodiment, prior to first use, the mathematical model 30 is written in the syntax of a modeling language system or package 35 (e.g., GAMS or AIMMS) and stored as a model file. Then, each time the process is run, problem data and, optionally, a selection of modeling options, is input into the database spreadsheet 20 and then converted and stored as a data file in the syntax of the same modeling language package 35. The modeling language package 35 then combines the data file and the model file and converts the two into a format that a solver 40 can read. The solver 40 then "solves" the problem by performing the requested computations until optimality criteria are achieved and the algorithm self-terminates, or the user determines that a current feasible solution is sufficient and manually terminates the solver 40. In the preferred embodiment, the solver 40 is an external optimization engine such as, for example, CPLEX. Finally, the solver 40 communicates the solution back to the modeling language package 35 which generates one or more reports 15 of the results for the user. More specifically, in the preferred embodiment the system reports multi-port routes and ship schedules that are more economic than those the user would have generated manually or with prior art tools.

Database application 20, mathematical model 30, and solver 40 may operate on one or more computers 10 at one or more locations. Computer 10 includes a suitable input device, such as a keypad, mouse, touch screen, microphone, or other device to input information. Computer 10 also includes a suitable output device to convey the information associated with the operation of the solver 40, including digital or analog data, visual information, or audio information. Computer 10 may include a fixed or removable storage media, such as magnetic computer disks, CD-ROM, or other suitable media to receive output from and provide input to the database application 20. Although only a single computer 10 is shown, database application 20, mathematical model 30, and solver 40 may operate on separate computers 10, or may operate on one or more shared computers 10, without departing from the scope of the present invention.

In operation, a user inputs data into the database application. Input data is then chosen from set entries and parameters. The user may put in as much or as little data as necessary for the problem. In practice, the user may change certain parameters while keeping others constant to perform a "what if" analysis. Any and all input data may be modified by the user. In a "what-if" analysis, the user can take a current data input instance, and make slight perturbations or modifications to only a few, or even one parameter in order to determine if such a change will have an impact on the solution.

For further illustration, FIGS. 2A, 2B, 2C, 2D, 2E, 2F and 2G provide screenshots of one embodiment of the present invention. Unless otherwise noted, all values are in Kilotons or K-dollars.

FIGS. 2A and 2B, entitled "Product Schedule for Load Ports" and "Demand Schedule for Discharge Ports," respectively, provide screen shots from one continuous spreadsheet for production and demand information. FIG. 2A displays information for the load ports and FIG. 2B provides data for the discharge ports. In this example the load ports and discharge ports are Exxon Mobil (XOM) load and discharge ports. A button in the right hand corner entitled "Discharge Port Information" in FIG. 1 and "Load Port Information" in FIG. 2 allows the user to toggle between the screens shown in FIGS. 2A and 2B.

The specific information provided in FIG. 2A is related to the production/accumulation for of bulk product at the specified supply ports, identified as Source 1, Source 2 and Source 3. Column A displays the date, in this instance each day of the month of May, 2006. Columns B, E and H (labeled "Inv") display the projected inventory levels for the three ports for a particular day. The remainder of the columns displays inventory capacity for the ports. Specifically, columns identified as "Min" display the minimum bounds of what is allowed to be stored on a given day and the "Max" columns display the maximum limit of what is allowed to be stored.

The specific information provided in FIG. 2B is related to the consumption rate of bulk product for specific discharge ports, identified as Dest1, Dest2, Dest3, and Dest4. Again, column A displays the date, in this instance each day from May 21, 2006 to Jun. 20, 2006, and the remainder of the columns displays inventory capacity for the specific ports.

Figure 2C:
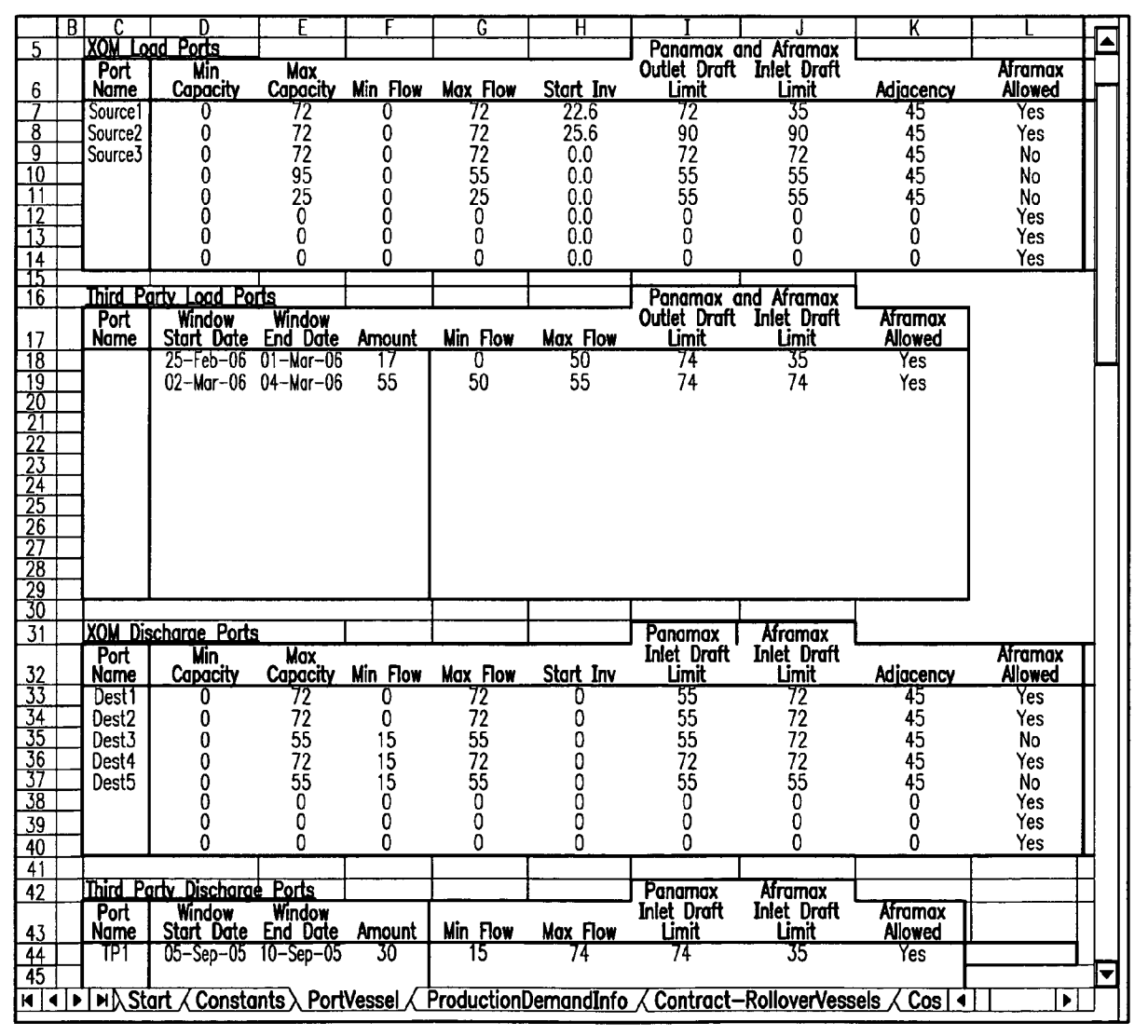

FIG. 2C, entitled "XOM Load Ports," provides a screenshot of port information. The screen is divided into four sections or blocks. The top two sections provide information for load ports. The upper section (beginning at column C, row 6) displays information for Exxon Mobil (XOM) load ports, referred to as Source 1, Source 2, etc. in column C. Columns D and E display any minimum or maximum storage capacity at that source. In this instance the minimum is 0 and the maximum is 72 Kilotons for each of Source 1, Source 2 and Source 3, which is also referred to in FIG. 2A. Columns F and G display the minimum and maximum flow of bulk product in each instance a ship or vessel is brought in to port. In this example, each instance a ship is brought in to port to load or discharge, the ship must take at least 0 and at most 72 Kilotons. Column H displays the starting inventory on day 1 at the specific port. Columns I and J display the outlet draft and the inlet draft to both Panamax and Aframax type ships. The outlet draft limit applies to when the ship is leaving the port; the inlet draft limit applies when the ship is entering port. Both define the maximum Kilotons of quantity on that ship either entering a port or leaving a port. For Example, Source 1 can have no more than 72 k-tons when a ship is leaving port and when a ship is entering it can have no more than 35 k-tons. Column K displays adjacency, which is a limit in days within which two ships can enter a port. In this instance, this feature is not activated. Lastly, column L indicates whether Aframax ships are allowed in the specific port.

The second block displays information pertaining to third party (in this instance, non-Exxon Mobil) load ports. This block provides much of the same information as the previous block with some exceptions. Column C and D display dates or time window in which a specific third party port is available for loading. Column F displays the amount available for loading within the time frame specified.

The bottom two blocks in screenshot of FIG. 2C provide information for discharge ports. The upper block displays information for Exxon Mobil discharge ports referred to as Dest1, Dest2, Dest3, Dest4 and Dest5, which is also referred to in FIG. 2B. The information displayed in this block is the same as the corresponding block for Exxon Mobil load ports except that it is for discharge of material (i.e., unloading of bulk product from the ship at the specified destination site). Finally, the last block displays similar information to that of third party load port except it is for third party discharge ports.

FIG. 2D, entitled "VESSEL INFORMATION," provides a screenshot of vessel (in this case ship) information. Column C displays a list of specific vessels available to be used. Column D displays the vessel use. For example, an indication that the ship is chartered indicates that the ship is already chartered (and thereby incurring a cost whether the ship is used or not). The indication that the ship is "New" is an indication that there is no commitment to use the ship or not use the ship (and thereby no cost will be incurred if the ship is not used). Column E displays the type of vessel; in this instance either Panamax or Aframax. Column F displays the maximum capacity of the vessel in Kilotons. Columns G, H, I, and J display various economic information related to shipping for specific vessels. Column K displays the initial volume of bulk product in the vessel. None of the vessels in this screen have any initial volume. Column L displays an upper limit on the maximum number of days of demurrage that are allowed for a vessel to incur. Columns M and N define a window in time in which to start using a vessel. That is the displayed dates represent the earliest and latest allowed start date for a vessel. Column O displays any penalties or incentives if a vessel is used. Column P displays the minimum % capacity for the vessel. That is, if a specified ship is chosen, column P displays the percentage of its full capacity that the ship must be filled.

In the upper left hand corner of FIG. 2D is a button that allows the user to toggle between this screen and the screen for Port Information (FIG. 2C). Finally, FIG. 2D displays default values which will populate the screen for the relevant classes of ships if the "Reset to Default" button in the upper left hand corner is activated by the user.

FIG. 2E, entitled "Cost," provides a screenshot of travel costs. The screen displays three different blocks which display information related to different travel legs. The upper block displays cost information for traveling from one load port (Source1, Source2 etc.) to a different load port. The middle block displays cost information for traveling from a load port to a discharge port (Dest1, Dest2, Dest3, etc). The lower block displays cost information for traveling from one discharge port to a different discharge port. In FIG. 2E the numbers are rounded and would typically display flat rates.

FIG. 2F, entitled "Time," provides a screenshot of travel time. Like the screen for travel costs, the screen displays three different blocks which display information related to different travel legs. The upper block displays time information for traveling from one load port (Source1, Source2 etc.) to a different load port. The middle block displays time information for traveling from a load port to a discharge port (Dest1, Dest2, Dest3, etc). The lower block displays time information for traveling from one discharge port to a different discharge port. In FIG. 2F the numbers in provided are in days.

FIG. 2G provides a screenshot of a report of a summary of information pertaining to the solution of the problem produced by the model. The report displays the total overall shipping cost as well as certain component costs such as demurrage costs and total legs cost. The report also displays a summary of the load port, issuing inventory, filing inventory and how much was loaded. The loading report for vessels identifies a specific port on a certain date for a specific vessel and identifies how much is loaded or discharged.

The invention further provides for a method of minimizing a total cost basis for the transportation scheduling and inventory management of bulk product over a period of time utilizing the system described above. The first step in the method is inputting data and/or modeling options into a database system, wherein the database system interfaces with a mathematical model. The second step in the method is solving the mathematical model after the data and/or modeling options are input using an optimization engine to obtain a schedule for routing vessels in loading, transporting and discharging. Steps one and two can be repeated one or more times with different data to obtain more than one schedule. The step of solving the model should be performed in an hour or less, preferably 15 minutes or less, and more preferably in 5 minutes or less.

5.3 Example

This Example describes one preferred embodiment of the system and method of the present invention as applied to a specific transportation problem. The Example is directed toward the problem of shipping liquid bulk product (e.g., VGO) in ships. It should be understood that the system described can be applied to many bulk products and many other means of transportation and that the various equations expressed herein, while preferred, are merely illustrative of equations that can be used to achieve the objectives of the particular problem being solved.

A complete mathematical programming formulation or model for the transportation of bulk product is provided that finds the minimum or reduced cost basis schedule over a period of time for routing vessels (in this case ships) in loading, transporting and discharging the bulk product while maintaining all capacities, constraints and restrictions related to inventory or specific ports. Optimizing the transportation costs via the method and/or system as provided results in a substantial cost savings.

This Example transportation scheduling problem is given the following data inputs: (i) a scheduling time horizon; (ii) supply and demand profiles for various ports; (iii) inventory limits; (iv) constraints and restrictions for all ports; (v) a heterogeneous pool of previously chartered or available vessels to use for transporting product; (vi) a network of all possible transportation legs; and (vii) fixed and variable cost structure associated with transportation, demurrage time and penalties, and inventory costs.

For this Example problem, the mathematical formulation or model is developed under the following assumptions: (i) inventories are based on the end of the day volume; (ii) a vessel can visit each port more than once; (iii) a vessel is limited to one day per visit at each port; and (iv) ports are classified as either load-only or discharge-only.

This Example problem has a few key characteristics. First, there are changing supply and demand outlooks on a daily basis. Second, the supply locations' inventory and the consumption location's inventory must stay within a maximum and a minimum. Third, the problem allows for a heterogeneous fleet of ships, which fall into one of two classes: Aframax or Panamax. Fourth, ships may be either term-leased or chartered and may be of different sizes, though all have a limited carrying capacity. Fifth, there are minimal and maximal loading and unloading volumes for each port. Sixth, there are standard travel times between ports. Seventh, each ship is permitted to pickup and deliver to multiple locations, provided it obeys its inventory limit and port-specific draft restrictions. Eighth, there are both first party and third party ports. Ninth, there are vessel size and draft limits for ports. Tenth, third party locations have no inventory requirements and need not have product lifted from them. Eleventh, and finally, the transportation costs include flat rates, overage calculations and demurrage costs and other incentives and penalties.

These characteristics are specific to this problem. As will be evident to those in the art, the characteristics and assumptions may change for different transportation problems. As a result the model, as illustrated below, will also change to accommodate the changing characteristics of the problem. The routing of specific vessels, as well as the timing of each particular leg of the trip and amount loaded and/or discharged, is to be determined by the solution of the problem.

In the preferred embodiment, the mathematical model or formulation for this problem takes the form of a mixed integer linear programming ("MILP") problem. The following provides the preferred approach to developing the mathematical model for the problem. It should be understood that this approach, and in particular, the specific equations used as part of the model, represent only one solution among many possibilities that provide a viable mathematical model. Other models may be formulated that provide optimized results to the user in a practical time frame so that the results may be implemented. As an illustration, alternate equations are provided in some instances in the following example model. The alternate equations in some instances take into account an alternate assumption or condition; in other instances the alternate equations are provided simply as an illustration that the mathematical model can take various forms.

The actual choice of equations may affect the time required by the solver to solve the model and provide feasible or optimal results. So, in practice, equations are developed or chosen that solve the problem in a practical amount of time, which time will depend on the specific transportation problem. In the preferred embodiment, optimized or feasible results are obtained in a time frame ranging from seconds to no more than one hour. In alternate embodiments, optimized or feasible results are obtained in fifteen minutes or less, or preferably five minutes or less, or alternatively less than one minute.

The following illustrates the shipping, inventory and cost considerations, and corresponding equations, that are incorporated into the mathematical model or formulation (unless otherwise noted, "model" and "formulation" are used interchangeably).

5.3.1 Terms of the Model

This section defines all the terms of the following mathematical model.

(A) Sets

Sets are lists of elements of the data instance (e.g., a set of vessels V consists of Aframax1, Aframax2, Panamax1, etc.). The Sets used in the mathematical model for the Example problem are provided in Table 1 below.

TABLE 1

| | |
|---|---|
| G | pairings of load ports to discharge ports for segregated product |
| J | all ports |
| $J^0$ | all original non-clone ports $J^0 \subseteq J$ |
| $J^3$ | all 3rd party ports $J^3 \subseteq J$ |

TABLE 1-continued

| | |
|---|---|
| $J^L$ | all load ports $J^L \subseteq J$ |
| $J^D$ | all discharge ports $J^D \subseteq J$ |
| $J^{LD}$ | ports with draft limits, $J^{LD} \subseteq J^L$ |
| $J^{DD}$ | discharge ports with draft limits, $J^{DD} \subseteq J^D$ |
| $J_j^R$ | all port names for revisits of port j |
| $L^{JJ}$ | allowed travel legs (jj') (edge set) |
| V | all vessels |
| $V^{Chart}$ | all previously chartered vessels, $V^{Chart} \subseteq V$ |
| $V_j^X$ | disallowed vessels at port j |
| T | days (time intervals) |
| $T_j^{BOJ}$ | set of days for which a black out day has been determined to occur for port j, $T_j^{BOJ} \subset T$ |

(B) Indices

Indices are predefined terms in the equations used to index the sets within the equations (e.g., the index v refers to an arbitrary individual element of set of vessels V). The Indices used in the mathematical model for the Example problem are provided in Table 2 below:

TABLE 2

| | |
|---|---|
| j | port $j \in J$ |
| v | vessel $v \in V$ |
| t | day $t \in T$ |

The use of sets and indices allows for the equations of the model to be defined independently from any particular data input instance.

(C) Parameters

Parameters are set indexed data values (e.g., if the demurrage rate for vessel Aframax1 is defined as DR(v=Aframax1)=20). The Parameters used in the mathematical model for the Example problem are provided in Table 3 below.

TABLE 3

| | |
|---|---|
| $B_v$ | basis amount of product for vessel v |
| $C_{jj'}$ | flat rate for leg (jj') |
| $C_v^{PEN}$ | penalty cost or incentive for using vessel v |
| $D_{jt}$ | product lifting demand at port $j \in J^D$ on day t |
| $DW_v^{lim}$ | demurrage days limit for vessel v |
| $DR_v$ | demurrage rate of vessel v |
| $day_t$ | day t |
| $draft_{vj}^{L,in}$ | inlet draft limit of vessel v at loading port j |
| $draft_{vj}^{L,out}$ | outlet draft limit of vessel v at loading port j |
| $draft_{vj}^{D}$ | inlet draft limit of vessel v at discharge port j |
| $F_j^{min}$ | minimum flowrate at port j |
| $F_j^{max}$ | maximum flowrate at port j |
| $I_j^0$ | initial inventory of port j |
| $I_{jt}^{min}$ | minimum inventory at port j on day t |
| $I_{jt}^{max}$ | maximum inventory at port j on day t |
| $I_v^{V,max}$ | maximum amount of product on vessel v |
| $I_v^{V,max}$ | adjusted maximum volume of vessel v |
| $I_v^{V0}$ | initial product inventory of vessel v |
| M | minimum amount of product to be transported |
| $N^{LBV}$ | lower bound on the number of vessels used |
| $N^{UBV}$ | upper bound on the number of vessels used |
| ND | number of days of discharge port offset |
| NT | total number of days in time horizon |
| $OVR_v$ | overage rate of vessel v |
| $pct_v$ | minimum percent full base volume for vessel v |
| $P_{jt}$ | product amount produced at port $j \in I^L$ on day t |
| $R^{max}$ | maximum cost per volume ratio |
| $T_v^{Chart}$ | start day for demurrage calculation for chartered vessel $v \in V^{Chart}$ |
| $T_j^{WTi}$ | initial day for a time window for a port |
| $T_j^{WTf}$ | final day for a time window for a port |
| $T_v^{WVi}$ | initial day for a loading time window for a vessel |
| $T_v^{WVf}$ | final day for a loading time window for a vessel |
| $T_{jj'}$ | minimum travel time for leg (j, j') |

TABLE 3-continued

| | |
|---|---|
| $T_j^{W3i}$ | time window initial day for availability of product load/discharge at $j \in J^3$ |
| U | upper bound on the number of total legs per vessel |
| $WS_v$ | world scale multiplier of a vessel |

(D) Variables

Variables (continuous and binary) are the unknown decisions that the optimization tool needs to make, and they are defined based on their set indices.

The Continuous Variables used in the mathematical model for the Example problem are provided in Table 4:

TABLE 4

| | |
|---|---|
| $DW_v$ | demurrage days of vessel v |
| $f_{vjt}^L$ | flow of product from load port j to vessel v on day t |
| $f_{vjt}^D$ | flow of product from vessel v to discharge port j on day t |
| $f_{vj}^{L,tot}$ | total flow of product from load port j to vessel v |
| $f_{vj}^{D,tot}$ | total flow of product from vessel v to discharge port j |
| $first_v$ | day vessel v starts its trip |
| $I_{jt}$ | product inventory level at port j at end of day t |
| $I_{vt}^V$ | product inventory level of vessel v at end of day t |
| $I_v^{V,tot}$ | total maximum product inventory for vessel v |
| $last_v$ | day vessel v finishes its trips |
| $OV_v$ | overall overage volume of vessel v |
| $OV_{vjj'}^{JJ}$ | overage volume of vessel v on leg (jj') |
| TF | total cost |

The Binary Variables used in the mathematical model for the Example problem are provided in Table 5.

TABLE 5

| | |
|---|---|
| $h_v$ | = 1 if vessel $v \in V$ is used |
| $u_{vjt}$ | = 1 if vessel v visits port j on day t |
| $x_{vjj'}$ | = 1 if vessel v travels from port j to port j' |

5.3.2 Objective Function of the Model

The total transportation cost is a combination of voyage flat rate calculated based on legs traveled, the overage calculations, demurrage costs and optional penalties the user can impose for costs associated with usage of various vessels. The ideal objective function for this shipping problem would be to minimize the total cost-per-amount of product transported. This, however, results in a non-convex objective function and interferes with the ability to solve the problem with an MILP solver if modeled directly. In order to approximate this cost-per-amount ratio in the objective, it is modeled as the total cost-per-amount minus a parameter n all multiplied by the total product amount transported. Theoretically, if n is set to the optimal cost-per-amount, assuming it is known before trying to solve the problem computationally, the solution to the MILP problem should be exactly equivalent to the solution using the non-convex cost-per-amount function as the objective. When n is set to an approximate value for the optimal cost-per-amount ratio, the "true" optimal solution is likely to be achieved with this heuristic objective. The choice of n is provided by the user and is an estimate of an expected optimal cost-per-amount.

The objective function can be posed in a number of ways. The following is only one example of a function used in practice:

$$TF = \sum_{v \in V} B_v WS_v \sum_{(jj') \in L^{JJ}} C_{jj'} x_{vjj'} + \sum_{v \in V} OVR_v WS_v \sum_{(jj') \in L^{JJ}} C_{jj'} OV_{vjj'}^{JJ} +$$

-continued $$\sum_{\upsilon \in V} DR_\upsilon DW_\upsilon - \eta \sum_{\upsilon \in V} \sum_{j \in J} \sum_{t \in T} f^I_{\upsilon j t} + \sum_{\upsilon \in V} C^{PEN}_\upsilon h_\upsilon$$

where TF is the total cost, $B_\upsilon$ is the basis amount of product for vessel $\upsilon$, $WS_\upsilon$ is the world scale multiplier of a vessel, $C_{jj'}$ is the flat rate for leg (jj'), $x_{\upsilon jj'}$ is 1 if vessel $\upsilon$ travels from port j to port j', $OVR_\upsilon$ is the overage rate of vessel $\upsilon$, $L^{JJ}$ is allowed travel legs (jj') (edge set), $OV_{\upsilon jj'}^{JJ}$ overage volume of vessel $\upsilon$ on leg (jj'), $DR_\upsilon$ is the demurrage rate of vessel $\upsilon$, $DW_\upsilon$ is the demurrage days of vessel $\upsilon$, $f_{\upsilon j t}^I$ is the flow of product from port j to vessel $\upsilon$ on day t, $C_\upsilon^{PEN}$ is penalty cost or incentive for using vessel $\upsilon$, and $h_\upsilon = 1$ if vessel $\upsilon \in V$ is used.

5.3.3 Inventory Balance Constraints

The inventory of bulk product at each port at the end of day t is equal to the inventory at the end of day t−1 adjusted by any amount loaded to or discharged from vessels on day t−1 adjust by any amount loaded to or discharged fropm vessels on day t along with any production or consumption of the product on day t. However, for discharge ports, because complete information about the product demand is not always known, the inventories are set equal to the total amount discharged from a vessel on a given day. Constraints for the case when the demand consumption information is known are detailed along with an alternate formulation for the case assuming virtually unlimited demand. At third party ports, some amount of product is made available over a time range, and bookkeeping is considered for that amount. There is no production or consumption of product at these ports, however, and the time window of availability is typically more limited than first party ports.

Vessel inventory at the end of day t is similarly equal to the inventory at the end of day t−1 adjusted by loads or discharges on day t. Inventories on day 0 are zero. All vessels in this problem are required to have zero inventory of product by the last day of the time horizon in order to ensure that all product that is loaded is also discharged in the same schedule.

The inventory constraints are adjusted in order to allow for multiple visits to a port by some vessel. In the instance of first party ports, this is handled via "cloning" a port by adding virtual port nodes in the network and considering all clones in the same inventory balance for the original port that is cloned. This is tracked using sets $J^R_j$ to link clones with their corresponding original port from set $J^O$. For third party ports, revisits are more easily handled by simply creating additional clones of the port with product amounts and time window data. The time windows for third party ports and their corresponding clones must not overlap. One example of equations for this constraint is provided by the following:

$$I_{jt} = I_{j,t-1} + P_{jt} - D_{jt} - \sum_{\upsilon \in V} f^L_{\upsilon j t} -$$

$$\sum_{\upsilon \in V} \sum_{j' \in J^R_j} f^L_{\upsilon j' t} + \sum_{\upsilon \in V} f^D_{\upsilon j t} + \sum_{\upsilon \in V} \sum_{j' \in J^R_j} f^D_{\upsilon j' t} \quad \forall j \in J^0, t \in T$$

$$I_{j0} = I^O_j \quad \forall j \in J^0$$

$$I^V_{\upsilon t} = I^V_{\upsilon,t-1} + \sum_{j \in J^L} f^L_{\upsilon j t} - \sum_{j \in J^D} f^D_{\upsilon j t} \quad \forall \upsilon \in V, t \in T, t < NT$$

$$I^V_{\upsilon 0} = I^{VO}_\upsilon \quad \forall \upsilon \in V$$

$$I^V_{\upsilon,NT} = 0 \quad \forall \upsilon \in V$$

where $I_{jt}$ is the product inventory level at port j at end of day t, $P_{jt}$ is the product amount produced at port $j \in I^L$ on day t, $D_{jt}$ is the product lifting demand at port $j \in J^D$ on day t, $f_{\upsilon j t}^L$ flow of product from load port j to vessel $\upsilon$ on day t, $f_{\upsilon j t}^D$ is flow of product from vessel $\upsilon$ to discharge port j on day t, $I^O_j$ is initial inventory of port j, $J^O$ is all original non-clone ports $J^O \subset J$; $I^V_{\upsilon t}$ is the product inventory level of vessel $\upsilon$ at end of day $\overline{t}$, $I^{VO}_\upsilon$ is the initial product inventory of vessel $\upsilon$, NT is the total number of days in time horizon, and T is days (time intervals).

Alternate discharge port inventory constraints do not take into account the demand of first party ports. They only limit the daily discharge based on the port capacity. Thus, the following alternative equation can be used:

$$I_{jt} = \sum_{\upsilon \in V} f^D_{\upsilon j t} + \sum_{\upsilon \in V} \sum_{j' \in J^{DR}_j} f^D_{\upsilon j' t} \quad \forall j \in J^D, t \in T$$

One issue of primary concern is the possibility of the problem being infeasible for a given set of production and lifting demand parameters. Because the inventory constraints are equalities requiring all product listed in production to be transported or stored, and all lifting demands be met, the minimum and maximum bounds on the inventory of product at each site may limit the possibility of finding a feasible solution, and the reason for that infeasibility may not be obvious from casual observation.

In order to account for this limitation, the introduction of slack variables can be made to the inventory constraints. Penalty costs are placed on this slack as part of the objective to make them very unattractive, and so they are not kept in the solution of the problem. These slack variables allow the MILP solver to terminate with a "feasible" solution in all cases. If the slack variables have a non-zero value, however, then the solution provided will not be able to fully meet all production and lifting demands. The values of these slack variables also give the specific information about what production or lifting data is causing infeasibility.

5.3.4 Flow Rate Constraints

The following constraints require that product transferred to or from a vessel is to be treated as semi-continuous, i.e., transfers are either zero or have a minimum volume strictly greater than zero. Upper bounds on transfer amounts are also enforced with these constraints. One example of equations for this constraint is provided by the following:

$$F_j^{min} u_{\upsilon j t} \leq f_{\upsilon j t}^L \leq F_j^{max} u_{\upsilon j t} \quad \forall \upsilon \in V, j \in J^L, t \in T$$

$$F_j^{min} u_{\upsilon j t} \leq f_{\upsilon j t}^D \leq F_j^{max} u_{\upsilon j t} \quad \forall \upsilon \in V, j \in J^D, t \in T$$

where $F_j^{min}$ in is minimum flowrate at port j, $u_{\upsilon j t}$ is 1 if vessel $\upsilon$ visits port j on day t, $f_{\upsilon j t}^L$ is flow of product from load port j to vessel $\upsilon$ on day t, $F_j^{max}$ is the maximum flowrate at port j, and $f_{\upsilon j t}^D$ is the flow of product from vessel $\upsilon$ to discharge port j on day t.

5.3.5 Logical Constraints

Examples of equations for a number of logical constraints are provided by the following.

Only one vessel may stop at a particular load or discharge port on any particular day. Each vessel may stop at some particular load or discharge port only once.

$$\sum_{t \in V} u_{\upsilon j t} \leq 1 \quad \forall J \in J, t \in T$$

$$\sum_{t \in T} u_{\upsilon j t} \leq 1 \quad \forall \upsilon \in V, j \in J$$

where the expressions are as previously defined.

A vessel may only be at one place at one time, i.e., a vessel can only be at one out of all ports on any particular day.

$$\sum_{j \in J} u_{vjt} \leq 1 \quad \forall v \in tV, t \in T$$

where $u_{vjt}$ is 1 if vessel $v$ visits port $j$ on day $t$.

If a vessel does not stop at some port, then it may not have any travel legs to or from that port. Thus travel leg binaries are forced to zero whenever the port stop binaries are zero.

$$\sum_{\substack{j' \in J \\ (jj') \in L^{JJ}}} x_{vjj'} \leq \sum_{t \in T} u_{vjt} \quad \forall v \in V, j \in J$$

$$\sum_{\substack{j' \in J \\ (j'j) \in L^{JJ}}} x_{vj'j} \leq \sum_{t \in T} u_{vjt} \quad \forall v \in V, j \in J$$

where $L^{JJ}$ is allowed travel legs (jj') (edge set) and $x_{vjj'}$ is 1 if vessel $v$ travels from port $j$ to port $j'$.

Because it is assumed that no vessel will travel from a discharge port back to a load port, it is be inferred that a vessel may only take one leg that goes from a load port to a discharge port. This is an example of an assumption that may not apply in other transportation scenarios.

$$\sum_{\substack{(jj') \in L^{JJ} \\ j \in J^L, j' \in J^D}} x_{vjj'} \leq 1 \quad \forall v \in V$$

where $J^L$ is all load ports $J^L \subset J$ and $J^D$ is all discharge ports $J^D \subset J$.

The following constraints ensure that: if a vessel stops at a load port, then there is a travel leg for leaving the port; if a vessel stops at a discharge port, then there is a travel leg for entering the port; and, a vessel may only stop at ports, and travel between them, if there is a load-to-discharge leg in the voyage.

$$\sum_{(jj') \in L^{JJ}} x_{vjj'} = \sum_{j \in J^L} \sum_{t \in T} u_{vjt} \quad \forall v \in V$$

$$\sum_{(jj') \in L^{JJ}} x_{vjj'} = \sum_{j \in J^D} \sum_{t \in T} u_{vjt} \quad \forall v \in V$$

$$\sum_{j \in J} \sum_{t \in T} u_{vjt} + \sum_{\substack{(jj') \in L^{JJ} \\ j,j' \in J^L}} x_{vjj'} \sum_{\substack{(jj') \in L^{JJ} \\ j,j' \in J^D}} x_{vjj'} \leq Uh_v \quad \forall v \in V \ \forall v \in V$$

where U is an upper bound on the number of total legs per vessel with a maximum default value $U \leq 2|J|-2$ and $h_v$ is 1 if vessel $v \in V$ is used.

5.3.6 Travel Time Constraints

The following are the preferred travel time constraints for the Example problem. These constraints are only activated if two ports are in a vessel's voyage and direct travel between those two ports is in the voyage. One example equation for this constraint is provided by the following.

$$\sum_{\substack{t' \in T \\ t' \geq t + T_{jj'}}} u_{vj't'} \geq 1 - (2 - u_{vjt} - x_{vjj'}) \quad \forall v \in V, (jj') \in L^{JJ}, t \in T$$

where $T_{jj'}$ is the minimum travel time for leg (j,j')

5.3.7 Draft Limit Constraints

These constraints limit the total load a vessel may have when it resides in a port that has a limiting water depth. These constraints are enforced before and after loading is finished, and before discharge has begun. Draft limits are both port and vessel specific. One example of equations for this constraint is provided by the following.

$$I_{v,t-1}^V \leq \mathrm{draft}_{vj}^{L,in} + (I_v^{V,max} - \mathrm{draft}_{vj}^{L,in})(1-u_{vjt}) \forall v \in V, j \in J^{LD}, t \in T$$

$$I_{vt}^V \leq \mathrm{draft}_{vj}^{L,out} + (I_v^{V,max} - \mathrm{draft}_{vj}^{L,out})(1-u_{vjt}) \forall v \in V, j \in J^{LD}, t \in T$$

$$I_{v,t-1}^V \leq \mathrm{draft}_{vj}^D + (I_v^{V,max} - \mathrm{draft}_{vj}^D)(1-u_{vjt}) \forall v \in V, j \in J^{DD}, t \in T$$

where $I_{vt}^V$ is the product inventory level of vessel $v$ at end of day $t$, $\mathrm{draft}_{vj}^{L,in}$ is the inlet draft limit of vessel $v$ at loading port $j$, $I_v^{V,max}$ is the maximum amount of product on vessel $v$, $J^{LD}$ is ports with draft limits $J^{LD} \subset J^L$; $\mathrm{draft}_{vj}^{L,out}$ is the outlet draft limit of vessel $v$ at loading port $j$, $\mathrm{draft}_{vj}^D$ is the inlet draft limit of vessel $v$ at discharge port $j$, and $J^{DD}$ is the discharge ports with draft limits $J^{DD} \subset J^D$.

An alternate draft limit constraint for discharge ports is provided by the following.

$$I_{vt}^V + f_{vjt}^D \leq \mathrm{draft}_{vj}^D + (I_v^{V,max} - \mathrm{draft}_{vj}^D)(1-u_{vjt}) \forall v \in V, j \in J^{DD}, t \in T$$

where the expressions are as previously defined.

5.3.8 Overage Calculation Constraints

This set of constraints is used to calculate the total load volume and overage tonnage (tons above base tons) for any given vessel on any given leg of its voyage. If any leg of a given vessel's voyage incurs overage, the overage rates apply to all legs of that voyage. One example of equations for this constraint is provided by the following.

$$OV_v \geq I_{vt}^V - B_v \quad \forall v \in V, t \in T \quad (1)$$

$$OV_v \leq \hat{I}_v^{V,max} \sum_{\substack{(jj') \in L^{JJ} \\ j \in J^L, j' \in J^D}} x_{vjj'} \quad \forall v \in V \quad (2)$$

$$OV_{vjj'}^{JJ} \geq OV_v - (\hat{I}_v^{V,max} - B_v)(1 - x_{vjj'}) \quad \forall v \in V, (jj') \in L^{JJ} \quad (3)$$

where $OV_v$ is the overall overage volume of vessel $v$, $I_{vt}^V$ is the product inventory level of vessel $v$ at end of day $t$, $B_v$ is the basis amount of product for vessel $v$, $\hat{I}_v^{V,max}$ is the adjusted maximum volume of vessel $v$, and $OV_{vjj'}^{JJ}$ is the overage volume of vessel $v$ on leg (jj').

Alternatively, equation 1 can be posed as follows:

$$OV_\upsilon \geq \sum_{j \in J^L} \sum_{t \in T} f^L_{\upsilon jt} - B_\upsilon \quad \forall \upsilon \in V$$

5.3.9 Demurrage Wait Time Consideration

The number of demurrage days for a particular vessel's voyage is calculated based on the first and last day of the voyage and takes into account the travel times for each leg. One example of equations for this constraint is provided by the following.

$$\text{first}_\upsilon \leq day_t + NT(1 - u_{\upsilon jt}) \quad \forall \upsilon \in V, u \in J^L, t \in T \quad (4)$$

$$\text{last}_\upsilon \geq day_t - NT(1 - u_{\upsilon jt}) \quad \forall \upsilon \in V, j \in J^D, t \in T \quad (5)$$

$$DW_\upsilon = \text{last}_\upsilon - \text{first}_\upsilon - \sum_{(jj') \in L^{JJ}} x_{\upsilon jj'} T_{jj'} \quad \forall \upsilon \in V \quad (6)$$

where $\text{first}_\upsilon$ is the day vessel $\upsilon$ starts its trip and $day_t$ is day t, and $\text{last}_\upsilon$ is the day vessel $\upsilon$ finishes its trips.

5.3.10 Relaxed Demurrage Time Calculation

In the alternate scenario where demand is assumed to be unlimited at the discharge ports, the number of demurrage days for a particular vessel's voyage is calculated based only on the first and last day of loading. The following equations replace equations (5) and (6) for this scenario (maximum demurrage can be specified per vessel).

$$\text{last}_\upsilon \geq day_t - NT(1 - u_{\upsilon jt}) \quad \forall \upsilon \in V, j \in J^L, t \in T$$

$$DW_\upsilon = \text{last}_\upsilon - \text{first}_\upsilon - \sum_{\substack{(jj') \in L^{JJ} \\ j, j' \in J^L}} x_{\upsilon jj'} T_{jj'} \quad \forall \upsilon \in V$$

where the expressions are as previously defined.

5.3.11 Binary Variable to Represent Vessel Usage

An artificial binary variable is added to the formulation to represent whether or not a vessel is used. The addition of the variable will typically help in reducing convergence time by adjusting the path of branching in the solution algorithm. One example of equations for this constraint is provided by the following.

$$h_\upsilon = \sum_{\substack{jj' \in L^{JJ} \\ j \in J^L, j \in J^D}} x_{\upsilon jj'} \quad \forall \upsilon \in V$$

$$h_\upsilon \in \{0, 1\} \quad \forall \upsilon \in V$$

where the expressions are as previously defined.

5.3.12 Previously Chartered Vessels

Previously chartered vessels are vessels that have already been hired and are therefore required to be used, but their voyage is unspecified. One example equation for this constraint is provided by the following.

$$\sum_{t \in T} \sum_{j \in J} u_{\upsilon jt} \geq 1 \quad \forall \upsilon \in V^{Chart}$$

where $V^{Chart}$ is all previously chartered vessels, $V^{Chart} \subseteq V$.

Chartered vessels have already been hired, so the demurrage calculation start date is known. One example equations for this constraint is provided by the following.

$$\text{first}_\upsilon = T_\upsilon^{Chart} \forall \upsilon \in V^{chart}$$

where $T_\upsilon^{Chart}$ is the start day for demurrage calculation for chartered vessel $\upsilon \in V^{Chart}$.

5.3.13 Relaxation Tightening Valid Inequalities

The flexibility of port and vessel specific draft limits detailed previously may improve the maximum vessel volume limits. When port and vessel specific draft limits are used for all ports ($J^L = J^{LD}$ and $J^D = J^{DD}$), the following is used to calculate an improved volume upper bound for vessels.

$$\hat{I}_\upsilon^{V,max} = \min\left(I_\upsilon^{V,max}, \max_{j \in J^{LD}}\{draft_{\upsilon j}^{L,in}\}, \max_{j \in J^{DD}}\{draft_{\upsilon j}^{D}\}\right)$$

where $J^{LD}$ is ports with draft limits, $J^{LD} \subset J^L$, $draft_{\upsilon j}^{L,in}$ is the inlet draft limit of vessel $\upsilon$ at loading port j, $draft_{\upsilon j}^{D}$ is the inlet draft limit of vessel $\upsilon$ at discharge port j, and $J^{DD}$ and discharge ports with draft limits, $J^{DD} \subset J^D$.

Then this new limit is applied to new bound limits for vessel volume.

$$0 \leq I_{\upsilon t}^V \leq \hat{V}^{V,max} \forall \upsilon \in V, t \in T$$

where the expressions are as previously defined.

These new limits are then used in conjunction with valid inequalities to tighten the relaxation of the MILP model. Using an artificial variable $I_\upsilon^{V,tot}$, the valid inequality constraint set is as follows.

$$I_\upsilon^{V,tot} = \sum_{j \in J^L} \sum_{t \in T} f_{\upsilon jt}^L \quad \forall \upsilon \in V$$

$$I_\upsilon^{V,tot} \leq h_\upsilon \hat{I}^{V,max} \quad \forall \upsilon \in V$$

$$0 \leq I_\upsilon^{V,tot} \leq \hat{I}^{V,max} \quad \forall \upsilon \in V$$

where the expressions are as previously defined.

5.3.14 Capacity Constraints and General Bounds

The following are simple bounds or capacities for all continuous variables. They are grouped together for organization and are used for maintaining various variables within physical, logical and realistic limits while the solver is working to optimize the solution. One example of equations for this constraint is provided by the following.

$$I_{jt}^{min} \leq I_{jt} \leq I_{jt}^{max} \forall i \in J^0, t \in T$$

$$0 \leq I_{\upsilon t}^V \leq I_\upsilon^{V,max} \forall i \in V, t \in T$$

$$0 \leq f_{\upsilon jt}^L \leq F_j^{max} \forall \upsilon \in V, j \in J^L, t \in T$$

$$0 \leq f_{\upsilon jt}^D \leq F_j^{max} \forall \upsilon \in V, j \in J^D, t \in T$$

$$0 \leq \text{first}_\upsilon \leq NT \forall \upsilon \in V$$

$$0 \leq \text{last}_\upsilon \leq NT \forall \upsilon \in V$$

$$0 \leq OV_\upsilon \leq \hat{I}^{V,max} - B_\upsilon \forall \upsilon \in V$$

$$0 \leq OV_{\upsilon jj}^{JJ} \leq \hat{I}^{V,max} - B_\upsilon \forall \upsilon \in V, (jj') \in L^{JJ}$$

$$0 \leq DW_\upsilon \leq DW_\upsilon^{lim} \forall \upsilon \in V$$

$$0 \leq TF$$

where $f_{\upsilon jt}^L$ is flow of product from load port j to vessel $\upsilon$ on day t; $f_{\upsilon jt}^D$ is the flow of product from vessel $\upsilon$ to discharge port j on day t; $DW_\upsilon^{lim}$ is the demurrage days limit for vessel $\upsilon$; $F_j^{min}$ is the minimum flowrate at port j; $F_j^{max}$ is the maximum flowrate at port j.

5.3.15 Optional Constraints

The following constraints are optional and may be included in the model, but can be omitted from the model while still providing optimized solutions. They can be added when the user wants to impose additional restrictions on the solutions that are provided (A) Grade Segregation Extension This set of constraints allows for the extension of the model to allow for specifying that all product loaded at some subset of ports in $J^L$ on a vessel must be discharged at a specific discharge port. A new compound set G is defined such that it is composed of all the matched sets of load ports for the discharge port j for which the segregation occurs. New variables $f_{vj}^{L,tot}$ and $f_{vj}^{D,tot}$ are defined to represent total product loaded or discharged at a port for the entire time horizon.

$$f_{vj}^{L,tot} = \sum_{t \in T} f_{vjt}^L \quad \forall v \in V, j \in J^L$$

$$f_{vj}^{D,tot} = \sum_{t \in T} f_{vjt}^L \quad \forall v \in V, j \in J^D$$

$$\sum_{j \in J^L} f_{vj}^{L,tot} = f_{vj}^{J,tot} \quad \forall v \in V, j \in J$$

$$0 \leq f_{vi}^{L,tot} \leq \hat{I}_v^{V,max} \quad \forall v \in V, i \in I$$

$$0 \leq f_{vj}^{D,tot} \leq \hat{I}_v^{V,max} \quad \forall v \in V, j \in J$$

where the expressions are as previously defined.

(B) Limit on the Number of Vessels Used

Limits on the minimum and maximum number of new vessels are achieved through bounds on the number of vessels used. One example equation for this constraint is provided by the following.

$$N^{LBV} \leq \sum_{v \in V} h_v \leq N^{UBV}$$

where $N^{LBV}$ and $N^{UBV}$ are the lower and upper bounds on the number of vessels to be used. In the preferred embodiment, the lower and upper bounds are 5 and 8 respectively. The use of this number of ships in this particular problem provides a feasible solution within the time frame of 15 minutes to an hour. More or less ships could be used if the timing of the solution is more or less demanding.

(C) Minimum Vessel Loads

This constraint sets a minimum percent base amount full for any new vessels hired or chartered vessels used. One example equations for this constraint is provided by the following.

$$\sum_{j \in J^L} \sum_{t \in T} f_{vjt}^L \geq pct_v B_v h_v \quad \forall v \in V$$

where $pct_v$ is the minimum percent full base volume for vessel $v$.

(D) Minimum Volume Transported

This constraint specifies a heuristic minimum amount of product transported in the time horizon by vessels. One example equation for this constraint is provided by the following.

$$\sum_{v \in V} \sum_{j \in J^L} \sum_{t \in T} f_{vjt}^L \geq M$$

where M is the minimum amount of product to be transported.

(E) Maximum Cost Per Amount Ratio

A maximum cost per volume ratio may also be optionally specified by the following equations:

$$R^{max} \sum_{v \in V} \sum_{j \in J^L} \sum_{t \in T} f_{vjt}^L \geq \sum_{v \in V} B_v WS \sum_{(jj') \in L^{JJ}} C_{jj'} x_{vjj'} +$$

$$\sum_{v \in V} OVR_v WS \sum_{(jj') \in L^{JJ}} C_{jj'} OV_{vjj'}^{JJ} + \sum_{v \in V} DR_v DW_v$$

where $R^{max}$ is the maximum cost per amount ratio.

(F) Port Revisit Order and Timing

In order to achieve additional run-time improvements, the symmetry breaking constraints based on revisit order and timing can be added to the mathematical model. The order of visitation rule states that original ports must be visited before a clone port is allowed to be visited, and that clone ports are prioritized according to their order of index. One example of equations for this constraint is provided by the following.

$$\sum_{t \in T} u_{vjt} \geq \sum_{t \in T} u_{vj't}$$

$$\forall v \in V, j \in J^0, j' \in J_j^R$$

$$\sum_{t \in T} u_{vj't} \geq \sum_{t \in T} u_{vj''t}$$

$$\forall v \in V, j \in J^0, j' \in J_j^R, j'' \in J_j^R, j' < j''$$

The timing of visitation rule states that original ports are visited before clone ports in time, and that clone ports are prioritized in time by order of index. One example of equations for this constraint is provided by the following.

$$\sum_{\substack{t' \in T \\ t' \leq t}} u_{vjt'} \geq \sum_{\substack{t'' \in T \\ t'' \leq t}} u_{vj't''}$$

$$\forall v \in V, j \in J^0, j' \in J_j^R, t \in T$$

$$\sum_{\substack{t' \in T \\ t' \leq t}} u_{vj't'} \geq \sum_{\substack{t'' \in T \\ t'' \leq t}} u_{vj''t''}$$

$$\forall v \in V, j \in J^0, j' \in J_j^R, j'' \in J_j^R, j' < j'', t \in T$$

(G) Preprocessing Techniques for Reducing Model Instance Size

The following equations apply to various methods that reduce the size of problem instances before being sent to the MILP solve, which can improve solver run-time. The user can manually adjust these. Anything parameter-based is based on user input. Again, these equations are optional and specific to the Example problem and could be changed or omitted depending on the specific transportation problem.

Fixing some variables with advance knowledge helps reduce the problem size and are provided by the following equations.

Legs not allowed:

$$x_{vjj'} = 0 \, \forall v \in V, (jj') \notin L^{JJ}$$

Third party port restrictions are as follows:

$$u_{vjt} = 0 \, \forall v \in V, j \in J^3, t < T_j^{W3i}$$

$$u_{vjt} = 0 \, \forall v \in V, j \in J^3, t > T_j^{W3f}$$

$$f_{vjt}^L = 0 \, \forall v \in V, j \in J^3, t < T_j^{W3i}$$

$$f_{vjt}^L = 0 \, \forall v \in V, j \in J^3, t > T_j^{W3f}$$

$$f_{vjt}^D = 0 \forall v \in V, j \in J^3, t > T_j^{W3i}$$

$$f_{vjt}^D = 0 \forall v \in V, j \in J^3, t > T_j^{W3f}$$

where $J^3$ is all 3rd party ports $J^3 \subset J$.

For a third party port the actual amount of product available to be loaded or discharged at a particular port within a given time window must be specified.

Vessel size restrictions for a port:

$$u_{vjt} = 0 \forall v \in V_j^X, j \in J, t \in T$$

Some ports are too small for an Aframax class vessel to visit. For chartered vessels, fixing a binary variable to one may also be included in the model.

$$h_v = 1 \forall v \in V^{Chart}$$

Time windows for port availability limit the overall range of days in which a port may be visited by vessels.

$$u_{vjt} = 0 \forall v \in V, j \in J, t < T_j^{Wli}$$

$$u_{vjt} = 0 \forall v \in V, j \in J, t > T_j^{Wlf}$$

where $T_j^{Wli}$ and $T_j^{Wlf}$ respectively represent the initial and final days for a time window for a port.

Port blackout days allow for limiting of specific days for which a port may not be visited by vessels.

$$u_{vjt} = 0 \forall v \in V, j \in J, t \in T_j^{BOJ}$$

where $T_j^{BOJ} T$ represents the set of days for which a blackout day has been determined to occur for a given port.

Vessel time windows limit the total range of days in which a vessel may visit loading ports.

$$u_{vjt} = 0 \forall v \in V, j \in J, t < T_v^{WVi}$$

$$u_{vjt} = 0 \forall v \in V, j \in J, t > T_v^{WVf}$$

where $T_v^{WVi}$ and $T_v^{WVf}$ respectively represent the initial and final days for a loading time window for a vessel.

(H) Redundant Legs Deactivated when Clone Ports Added

In order to prevent redundant binary variables and to break symmetry and cycles, various pairs of port-to-port legs can be removed when allowing for ports to be revisited and thus "cloned" in the model. These constraints are optionally activated by the user. The constraints of this section can potentially conflict with the constraints of Port Revisit and Timing. The user is warned of the conflict.

In general, the following legs are not allowed in the leg set $L^{JJ}$:

$$\{(j'j) | j \in J^0, j' \in J_j^R\}$$

where $J_j^R$ is all port names for revisits of port j.

In addition, when only a single load port and/or discharge port is allowed a single revisit, then the following legs may also be removed from the corresponding leg set $L^{JJ}$:

$$\{(jj') | j \in J^0, j' \in J^0\}$$

$$\{(jj') | j \in J^0, j' \notin J_j^R\}$$

Alternatively, a more limiting assumption may be used in that revisits of ports may only occur directly from the same port. Under that assumption, the following legs may be removed.

$$\left\{ (j'j) \mid j \in J, j' \in \bigcup_{\substack{j' \in J^0 \\ j'' \neq j}} J_{j''}^R \right\}$$

and when a port has more than one clone, remove the following:

$$\{(j''j') | j \in J^0, j' \in J_j^R, j'' \in J_j^R, j' > j''\}$$

$$\{(j''j') | j \in J^0, j'' \in J_j^R, \exists j' \in J_j^R s.t. j' < j''\}$$

(I) Rolling Time Horizon and Initial Conditions

A rolling time horizon may be implemented in order to allow the model to solve for time horizons forward in time, but keeping continuity between adjacent time horizons by implementing the solution of a previous time horizon as a starting point for a new time horizon. Using a rolling time horizon allows the solution of one problem instance to be used as the starting point for a next instance.

5.4 Closing

The various publications cited herein are hereby incorporated by reference in their entirety. While this description utilizes a variety of screenshots and preferred examples containing illustrative equations to fully illustrate the concepts behind the invention, the invention is by no means so limited. Various modifications, adjustments and applications of the disclosed invention will be apparent to those of ordinary skill in the art and are covered to the extent that they fall within the scope of the appended claims.

What is claimed is:

1. A computer system comprising memory and a processor, the computer system being programmed to perform steps comprising:
   providing a mathematical model containing equations that model transportation scheduling and inventory management of a bulk product from multiple supply locations to multiple demand locations
   to minimize cost per unit volume or mass of the bulk product,
   the model includes a parameter for demurrage rate and constraints for minimum flow rates at the demand locations, maximum flow rates at the demand locations, and vessel draft limits, and
   the model includes decision variables for: (i) the amount of bulk product to be loaded from a supply location onto a vessel, (ii) the amount of bulk product to be discharged from a vessel to a demand location, and (iii) demurrage time for a vessel;
   receiving data relating to the characteristics of a fleet of vessels, supply locations, and demand locations;
   applying the data to the mathematical model; and
   minimizing cost per unit volume or mass of the bulk product using a mathematical optimization solver to solve the mathematical model based upon the constraints and decision variables.

2. The computer system of claim 1 wherein the bulk product is selected from petroleum, natural gas and liquid or gaseous intermediates, and final products derived there from.

3. The computer system of claim 1 wherein the bulk product is liquefied natural gas.

4. The computer system of claim 1 wherein the mathematical model is in the form of a mixed integer linear programming problem.

5. The computer system of claim 1 wherein the model accounts for flat rates, overage calculation, and demurrage costs.

6. The computer system of claim 1 wherein the transportation vessels are a heterogeneous fleet of ships.

7. The computer system of claim 1 wherein the mathematical model comprises equations for each of the following constraints: (i) inventory balances; (ii) flow rates; (iii) logical constraints; (iv) travel times; (v) draft limits; (vi) overage calculations; (vii) demurrage or relaxed demurrage time calculations; and (viii) previously chartered vessels.

8. The computer system of claim 7, wherein the supply locations are load ports and the demand locations are discharge ports, and wherein the constraints include equations for one or more of the following: (i) only one vessel may stop at a particular load or discharge port on any particular day; (ii)

a vessel may only be at one place at one time; (iii) if a vessel does not stop at a port, then it may not have any travel legs to or from that port; (iv) a vessel may only take one leg that goes from a load port to a discharge port; (v) if a vessel stops at a load port, then there is a travel leg for leaving the port; (vi) if a vessel stops at a discharge port, then there is a travel leg for entering the port; (vii) a vessel may only stop at ports and travel between them if there is a load-to-discharge leg in the voyage.

9. The computer system of claim 8, wherein the supply locations are load ports and the demand locations are discharge ports, and wherein the mathematical model further comprises equations for bounds or capacities for one or more of the following continuous variables: (i) total cost; (ii) rate of flow of product from a load port to a vessel on a day; (iii) rate of flow of product from a vessel to a discharge port on a day; (iv) total flow of product from a load port to a vessel; (v) total flow of product from a vessel to a discharge port; (vi) first day a vessel starts its trip; (vii) product inventory level at a port at the end of a day; (viii) product inventory level of a vessel at the end of a day; (ix) total maximum product inventory for a vessel; (x) last day a vessel finishes its trips; (xii) overall overage volume of a vessel; and (xii) overage volume of a vessel on a leg.

10. The computer system of claim 7 wherein the inventory balance constraints contain slack variables which allow the solver to terminate with a feasible solution.

11. The computer system of claim 7 wherein the mathematical model further comprises one or more equations for a rolling time horizon.

12. The computer system of claim 7 wherein the mathematical model further comprises one or more equations for grade segregation constraints.

13. The computer system of claim 7 wherein the mathematical model further comprises equations for one or more of the following: bounds on the number of vessels used; minimum vessel loads; and minimum volume transported.

14. The computer system of claim 7 wherein the mathematical model further comprises equations for a maximum cost-per-amount ratio.

15. The computer system of claim 7 wherein the mathematical model further comprises equations for port-revisit order and timing.

16. The computer system of claim 7 wherein the mathematical model allows one or more of the variables to be fixed.

17. The computer system of claim 7, wherein the supply locations are load ports and the demand locations are discharge ports, and wherein the received data includes one or more of the following: (i) basis amount of product for a vessel; (ii) flat rate for a leg; penalty cost or incentive for using a vessel; (iii) product lifting needs at a port on a day; (iv) demurrage days limit for a vessel; (v) world scale multiplier of a vessel; (vi) inlet draft limit of a vessel at a loading port; (vii) outlet draft limit of a vessel at a loading port; (viii) inlet draft limit of a vessel at a discharge port; (ix) minimum flow rate at a port; (x) maximum flow rate at a port; (xi) minimum inventory at a port on a day; (xii) maximum inventory at a port on a day; (xiii) maximum amount of product on a vessel; (xiv) maximum volume of a vessel; (xv) minimum number of tons of product to be transported;

(xvi) lower bound on the number of vessels used; (xvii) upper bound on the number of vessels used; (xviii) number of days of discharge port offset; (xix) total number of days in time horizon; (xx) overage rate of a vessel; (xxi) minimum percent full base volume for a vessel; (xxii) product amount produced at a port each day; (xxiii) maximum cost per volume ratio; (xxiv) start day for demurrage calculation for a chartered vessel; (xxv) travel time for a leg; (xxvi) time window initial day for availability of product load/discharge at a third party port; (xxvii) time window final day for availability of product load/discharge at a third party port; (xxviii) time window initial day for availability at a port; (xxix) time window final day for availability at a port; (xxx) time window initial day for availability of a vessel; (xxxi) time window final day for availability of a vessel; and (xxxii) initial inventory of a port.

18. The computer system of claim 1, wherein the bulk product is a liquid bulk product.

19. The computer system of claim 18, wherein the bulk product is crude oil.

20. The computer system of claim 18, wherein the bulk product is vacuum gas oil.

21. The computer system of claim 18, wherein the bulk product is selected from the group of gasoline, kerosene, and aviation fuel.

22. The computer system of claim 18, wherein the bulk product is gas oils.

23. The computer system of claim 18, wherein the bulk product is intermediate refinery products.

24. The computer system of claim 1, wherein the cost basis is the number of vessels utilized.

25. The computer system of claim 1, wherein the decision variables for the amount of bulk product to be loaded or discharged from a vessel designates the location and time of the loading or discharge.

26. The computer system of claim 25, wherein the constraints include constraints relating to inventory balances and the rate at which bulk product can be loaded or discharged.

27. A method for minimizing a total cost basis for the transportation scheduling and inventory management of a bulk product over a period of time, the method comprising the steps of:
    providing a mathematical model containing equations that model transportation scheduling and inventory management of a bulk product from multiple supply locations to multiple demand locations to minimize cost per unit volume or mass of the bulk product,
    the model includes a parameter for demurrage rate and constraints for minimum flow rates at the demand locations, maximum flow rates at the demand locations, and vessel draft limits; and
    the model includes decision variables for: (i) the amount of bulk product to be loaded from a supply location onto a vessel, (ii) the amount of bulk product to be discharged from a vessel to a demand location, and (iii) demurrage time for a vessel;
    receiving data relating to the characteristics of a fleet of vessels, supply locations, and demand locations;
    applying the data to the mathematical model;
    minimizing a total cost basis for the transportation scheduling and inventory management of a bulk product over a period of time by minimizing the cost per unit volume or mass of the bulk product by solving the mathematical model by a computer system based upon the constraints and decision variables;
    determining a transportation plan based on the solution to the mathematical model; and
    loading bulk product onto a vessel, discharging bulk product from a vessel, or both, according to the transportation plan.

28. The method of claim 27 wherein the step of solving the model is performed by an optimization engine in an hour or less.

29. The method of claim 28 wherein the step of solving the model is performed by an optimization engine in 15 minutes or less.

30. The method of claim 29 wherein the mathematical model comprises equations for the following constraints: (i) inventory balances; (ii) flow rates; (iv) travel times; (v) draft limits; (vi) overage calculations; (vii) demurrage or relaxed demurrage time calculations; and (viii) previously chartered vessels.

31. The method of claim 28 wherein the step of solving the model is performed by an optimization engine in 5 minutes or less.

32. The method of claim 28 wherein the step of solving the model is performed by an optimization engine in 10 seconds or less.

33. The method of claim 27, wherein the decision variables for the amount of bulk product to be loaded or discharged from a vessel designates the location and time of the loading or discharge.

34. The method of claim 33, wherein the constraints include constraints relating to inventory balances and the rate at which bulk product can be loaded or discharged.

* * * * *